US011328601B1

(12) United States Patent
Isaksson et al.

(10) Patent No.: US 11,328,601 B1
(45) Date of Patent: May 10, 2022

(54) PREVENTION OF LOW-SPEED SIDESWIPE COLLISIONS WITH NON-MOVING OBJECTS

(71) Applicant: Volvo Car Corporation, Gothenburg (SE)

(72) Inventors: Malte Isaksson, Gothenburg (SE); Tomas Björklund, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/181,599

(22) Filed: Feb. 22, 2021

(51) Int. Cl.
    *B60Q 1/00*     (2006.01)
    *G08G 1/16*     (2006.01)
    *G08B 6/00*     (2006.01)
    *G06K 9/00*     (2022.01)

(52) U.S. Cl.
    CPC ......... *G08G 1/165* (2013.01); *G06K 9/00805* (2013.01); *G08B 6/00* (2013.01)

(58) Field of Classification Search
    CPC ....... G08G 1/165; G06K 9/00805; G08B 6/00
    See application file for complete search history.

(56) References Cited

U.S. PATENT DOCUMENTS

| | | | |
|---|---|---|---|
| 5,572,428 A * | 11/1996 | Ishida | B60W 30/18145 701/301 |
| 5,668,739 A | 9/1997 | League et al. | |
| 6,438,491 B1 * | 8/2002 | Farmer | G08G 1/164 701/301 |
| 8,260,539 B2 | 9/2012 | Zeng | |
| 9,405,006 B2 | 8/2016 | Ouchi | |
| 10,099,614 B2 | 10/2018 | Diessner | |
| 10,176,390 B2 | 1/2019 | Chen et al. | |

(Continued)

FOREIGN PATENT DOCUMENTS

CN           101303732 B     11/2008

OTHER PUBLICATIONS

Lowe, David G. | Object recognition from local scale-invariant features. Proceedings of the International Conference an Computer Vision, 1999, 8 pages.

(Continued)

*Primary Examiner* — Toan N Pham
(74) *Attorney, Agent, or Firm* — Amin, Turocy & Watson, LLP

(57) ABSTRACT

A computer-implemented method can comprise determining, by a system operatively coupled to a processor, points of interest comprising image coordinates in a set of images captured by an optical camera of a moving vehicle, determining, by the system, whether a multi-match exists in the set of images, in response to determining that the multi-match does not exist, rejecting, by the system, the points of interest, in response to determining that the multi-match exists, determining, by the system, whether the points of interest represent a false-positive determination of a stationary object, in response to determining that the points of interest are in motion and correspond to a false-positive, rejecting, by the system, the points of interest, and in response to determining that the points of interest are stationary and do not correspond to a false-positive, initiating, by the system, collision avoidance to avoid a stationary object corresponding to the points of interest.

20 Claims, 31 Drawing Sheets

(56) References Cited

U.S. PATENT DOCUMENTS

2017/0106857 A1    4/2017   Nasser et al.
2018/0005055 A1    1/2018   Jeong et al.

OTHER PUBLICATIONS

Pau, et al. | CDVS Whitepaper: STM Proposal. International Organisation for Standardisation, SO/IEC JTC1/SC29/WG11, Coding of Moving Pictures and Audio, ISO/IEC JTC1/SC29/WG11 MPEG2012/m26509 (2012).

Sonka et al. | Image Processing, Analysis, and Machine Vision. Thomson Learning, 3rd edition, 2018, pp. 572-591.

Björklund, Tomas | 3D pointer using stereo imaging. CBA Master Thesis No. 98, UU School of Engineering, UPTEC F07 071 (abstract only), May 14, 2007.

Nystrom, Ingela | List of Master Thesis Students, 2 pages, May 2, 2011.

\* cited by examiner

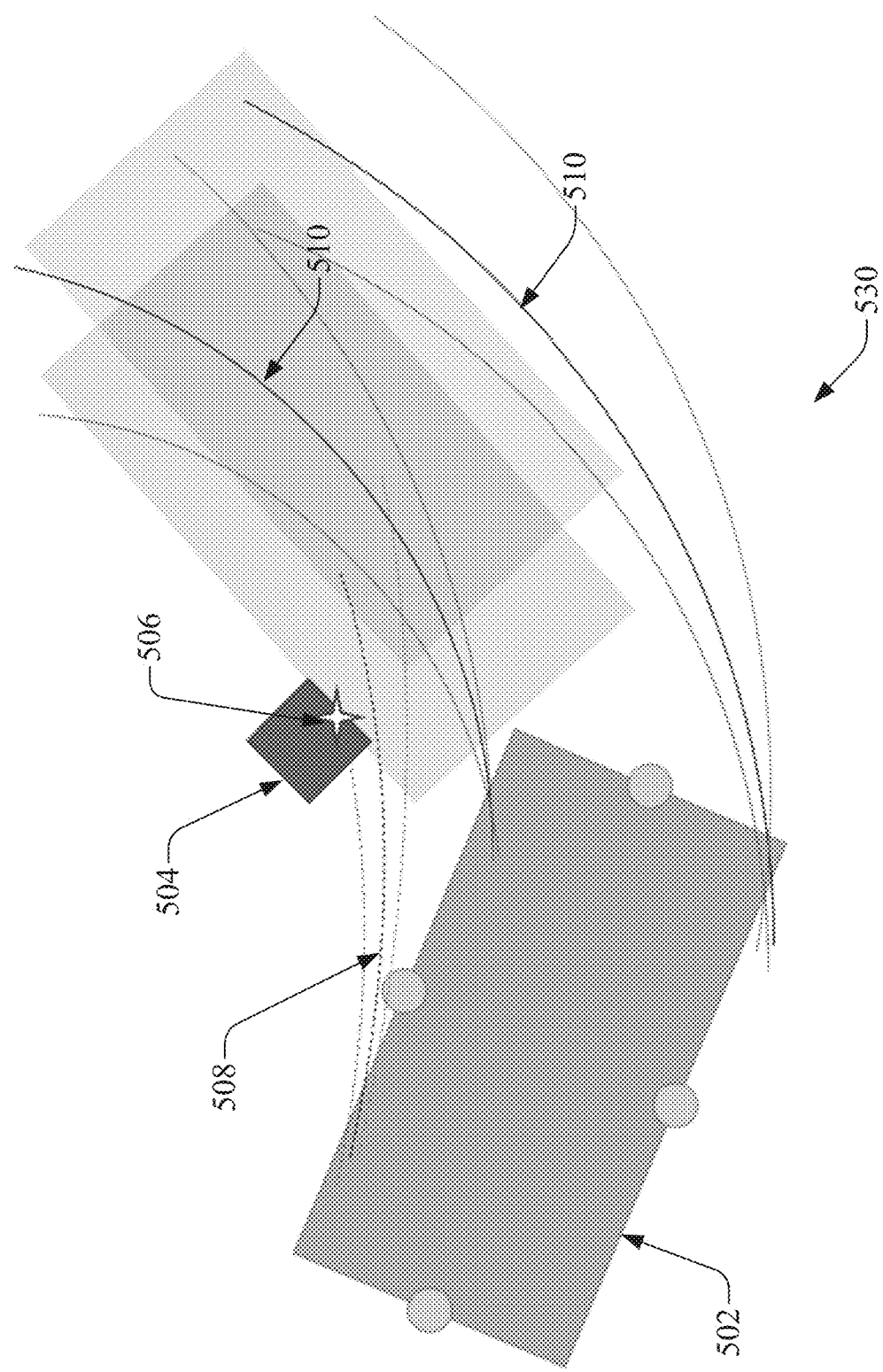

PREVENTION OF LOW-SPEED SIDESWIPE COLLISIONS WITH NON-MOVING OBJECTS

BACKGROUND

One or more embodiments herein relate stationary object identification, and specifically, to stationary object identification and collision avoidance.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that provide stationary object collision avoidance assistance.

Conventionally, object avoidance systems utilize radar or sonar sensors to detect objects. These sensors, however, can be costly to implement in vehicle. Many vehicles now include multiple optical cameras as part of vehicular 360° camera systems. Therefore, further utilization of such existing optical cameras can reduce the cost of an object avoidance system. However, utilization of such optical cameras can result false positive object identification. Therefore, there exists a need to accurately and efficiently identify stationary objects using existing vehicular optical cameras.

According to an embodiment, a computer-implemented method comprises determining, by a system operatively coupled to a processor, points of interest comprising image coordinates in a set of images captured by an optical camera of a moving vehicle, determining, by the system, whether a multi-match exists in the set of images, in response to determining that the multi-match does not exist, rejecting, by the system, the points of interest, in response to determining that the multi-match exists, determining, by the system, whether the points of interest represent a false-positive determination of a stationary object, in response to determining that the points of interest are in motion and correspond to a false-positive, rejecting, by the system, the points of interest, and in response to determining that the points of interest are stationary and do not correspond to a false-positive, initiating, by the system, collision avoidance to avoid a stationary object corresponding to the points of interest.

According to another embodiment, a system comprises a memory that stores computer executable components, and a processor that executes the computer executable components stored in the memory, wherein the computer executable components comprise a point of interest identification component that determines points of interest comprising image coordinates in a set of images captured by an optical camera of a moving vehicle, a matching component that determines whether a multi-match exists in the set of images, a motion determination component that determines whether the points of interest are stationary or in motion in response to determination by the matching component that the multi-match exists, and rejects the points of interest in response to a determination that the points of interest are in motion, wherein points of interest in motion correspond to a false-positive, and a collision avoidance component that initiates collision avoidance to avoid a stationary object corresponding to the points of interest in response to a determination by the motion determination component that the points of interest are stationary.

According to another embodiment, a computer program product comprising a computer readable storage medium having program instructions embodied therewith, the program instructions executable by a processor to cause the processor to determine, by the processor, points of interest comprising image coordinates in a set of images captured by an optical camera of a moving vehicle, determine, by the processor, whether a multi-match exists in the set of images, in response to a determination that a multi-match does not exist, reject, by the processor, the points of interest, in response to a determination that the multi-match exists, determine, by the processor, whether the points of interest represent a false-positive determination of a stationary object, in response to a determination that the points of interest are in motion and correspond to a false-positive, reject the points of interest, and in response to a determination that the points of interest are stationary and do not correspond to a false-positive, initiate, by the processor, collision avoidance to avoid a stationary object corresponding to the points of interest.

DESCRIPTION OF THE DRAWINGS

FIGS. 5A-5C illustrate diagrams of exemplary, non-limiting stationary object identification and collision avoidance techniques in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
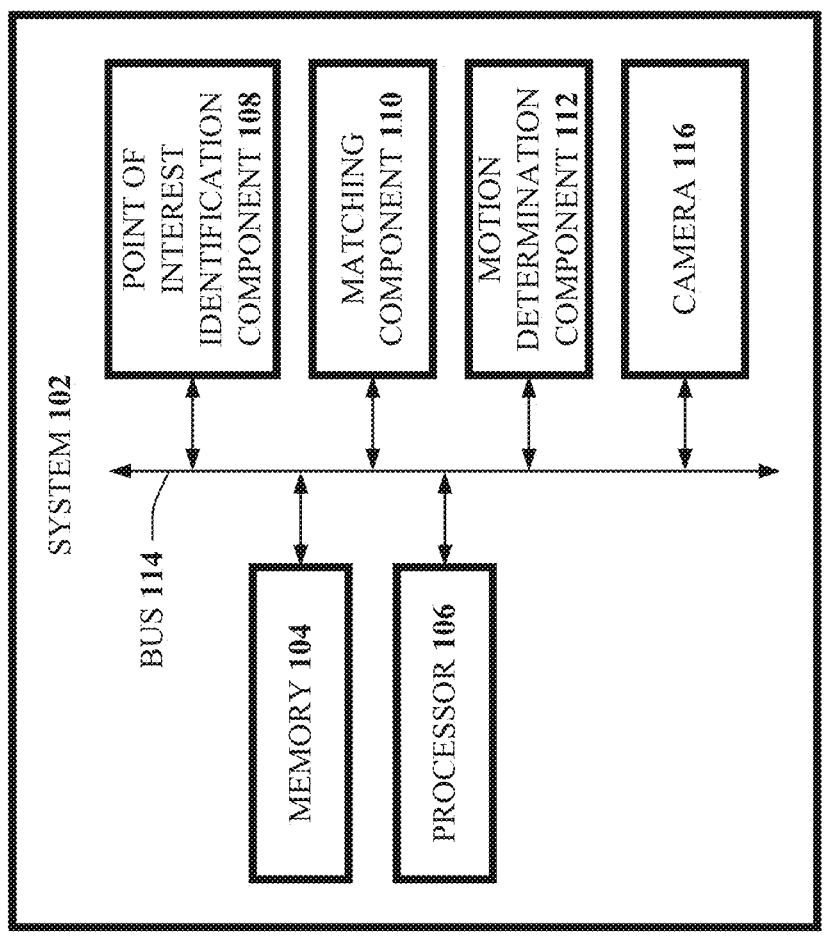
FIG. 1 illustrates a block diagram of an example, non-limiting system that can facilitate stationary object identification in accordance with one or more embodiments described herein.

FIG. 1 illustrates a block diagram of an example, non-limiting system 102 in accordance with one or more embodiments described herein. System 102 can comprise a memory 104, a processor 106, a point of interest (POI) identification (ID) component 108, a matching component 110, a motion determination component 112, a bus 114, and/or a camera 116. In various embodiments, one or more of the memory 104, processor 106, point of interest (POI) identification (ID) component 108, matching component 110, motion determination component 112, bus 114, and/or camera 116 can be communicatively or operably coupled to one another to perform one or more functions of the system 102.

POI ID component 108 determine points of interest (e.g., 3D points) in images. Such points of interest can comprise image coordinates in a set of at images (e.g., a set of at least three images). Such images can be captured by an optical camera (e.g., camera 116) of a vehicle (e.g., a moving vehicle). The POI ID component 108 can search images for points of interest (e.g., based on local variations in neighboring pixels) and transform said points of interest into a descriptor that can enable easier comparison or matching. To accomplish the foregoing, the POI ID component 108 can utilize, for instance, Scale Invariant Feature Transformation (SIFT) or Compact Descriptors for Visual Search (CDVS).

Matching component 110 can determine whether a multi-match exists in the set of images (e.g., a set of images). According to an embodiment, the multi-match can comprise a set of three images. In this regard, the multi-match can correspond to a triple-match. To determine whether a triple-match exists in a set of images, the matching component 110 can determine whether a first point of interest in a first image corresponds to a second point of interest in a second image, determine whether the first point of interest in the first image corresponds to a third point of interest in a third image, and determine whether the second point of interest in the second image corresponds to the third point of interest in the third image. In this regard, the matching component 110 attempts to make a triple-match. Stated otherwise, the matching component 110 attempts to make a match between a point in a first image and a corresponding point in a second image. In order for a triple-pair or a triple-match to exist, a third image must also contain a point that corresponds to points in the first and second images. The foregoing is depicted in diagram form in FIGS. 7-8.

Other embodiments can utilize multi-matches of different combinations. For instance, according to an embodiment, a multi-match can comprise a double match. In a double match, the matching component 110 can extrapolate a third point from the double match (e.g., in another image in addition to the two images of the double-match). Additional embodiments can, for instance, make a triple-match from a set of four images. In this regard, the matching component 110 can identify a triple-match from a set of four (or more) images. Further embodiments can utilize a quadruple match. In this regard, the matching component 110 can determine whether four points corresponding to four images all correspond to the same point. It can be appreciated that the matching component 110 or systems or methods herein are not limited to double, triple, or quadruple matching and other combinations can be utilized.

The matching component 110 can further reject points of interest in response to a determination that a multi-match (e.g., a triple-match) does not exist or accept points of interest if a multi-match does exist. Such matching by the matching component 110 can occur for hundreds or thousands of points of interest in a set of images (e.g., a set of three images). In this regard, hundreds or thousands of multi-matches can be made, resulting in confirmed objects in the set of images.

The matching component 110 can further determine geographic locations of the objects in the set of images. By computing the motion of the car from a previous point to a current point, based on a vehicle's wheel rotation and steering angle, a location difference of a camera (e.g., camera 116) can be determined, and the two images (from current and previous points) can be treated like a stereo setup. In this regard, a first position of the camera 116 at a first point in time and a second position of the camera 116 at a second point in time can be determined. This can allow for depth to be computed. However, this requires the located objects to remain in a fixed location, which is typically the case in parking situations. If an object is moving, computed depth and/or location can be incorrect. In this regard, three images can be used to obtain three pairs of stereo vision views using the same optical camera (e.g., camera 116). The matching component can compare pairs (1-2, 2-3, and 1-3), and compute 3D positions. If all three pairs yield the same location, then potentially a fixed object exists. If at least one pair yields a different location, the object is determined to be moving and the point of interest is discarded.

There are several special cases of motion, however, which using the foregoing processes can produce an illusion of a fixed object, even when using three image pairs to identify stationary objects from moving objects (hence a potentially fixed object exists). Such special cases are later discussed in greater detail.

The motion determination component 112 can further determine whether points of interest are stationary or in motion and reject the points of interest in response to a determination that the points of interest are in motion. It is possible that a false positive (e.g., a defined special case) exists, so 3D positions are subjected to special case testing (e.g., by the motion determination component 112). If an object is still determined to be stationary after special case testing (e.g., if the 3D positions do not match a defined special case), then the 3D points and an associated object can be treated (e.g., by the motion determination component 112) as a stationary object. Special case testing can comprise subjecting the 3D positions to a series of defined special cases that can appear as false-positive stationary objects. Such defined special cases are provided in FIGS. 13-17 and are thus later discussed in greater detail.

According to an embodiment, camera 116 can be a camera system located on a side of a vehicle. Camera 116 can be located in or on a door handle, sideview mirror, door, fender, wheel well, running board, roof, window frame, or another location on a side of a vehicle. In other embodiments, camera 116 can be located on a front or rear of a vehicle, such as on a bumper, grille, hood, tailgate, or roof. Camera 116 can comprise an optical camera, and can capture images at, for instance, 30 frames per second (fps) or 60 fps, though other framerates can be utilized. It can be appreciated that the camera 116 can comprise a camera from a 360° camera system of a vehicle. Such existing 360° systems are often utilized to show blind spots when parking and are currently available on many vehicles. Camera 116 can provide images or video to any component of the system 102 or other systems described herein.

Memory 104 can store one or more computer/machine readable and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to system 102, POI ID component 108, matching component 110, motion determination component 112, camera 116, or other components which will be later discussed in greater detail, such as collision avoidance component 204 and/or artificial intelligence component 304. Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. It can be appreciated that the memory 104 can store images, frames, pairs, points of interest, and/or other information utilized herein.

Processor 106 can comprise one or more types of processors and/or electronic circuitry (e.g., a classical processor, graphics processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor.

Bus 114 can comprise one or more memory bus, memory controller, peripheral bus, external bus, local bus, a quantum bus, and/or another type of bus that can employ various bus architectures (e.g., industrial standard architecture (ISA), extended ISA (EISA), micro-channel architecture (MSA), intelligent drive electronics (IDE), advanced graphics port (AGP), VESA local bus (VLB), peripheral component interconnect (PCI), universal serial bus (USB), card bus, small computer systems interface (SCSI), firewire (IEEE 1394), etc.).

Figure 2:
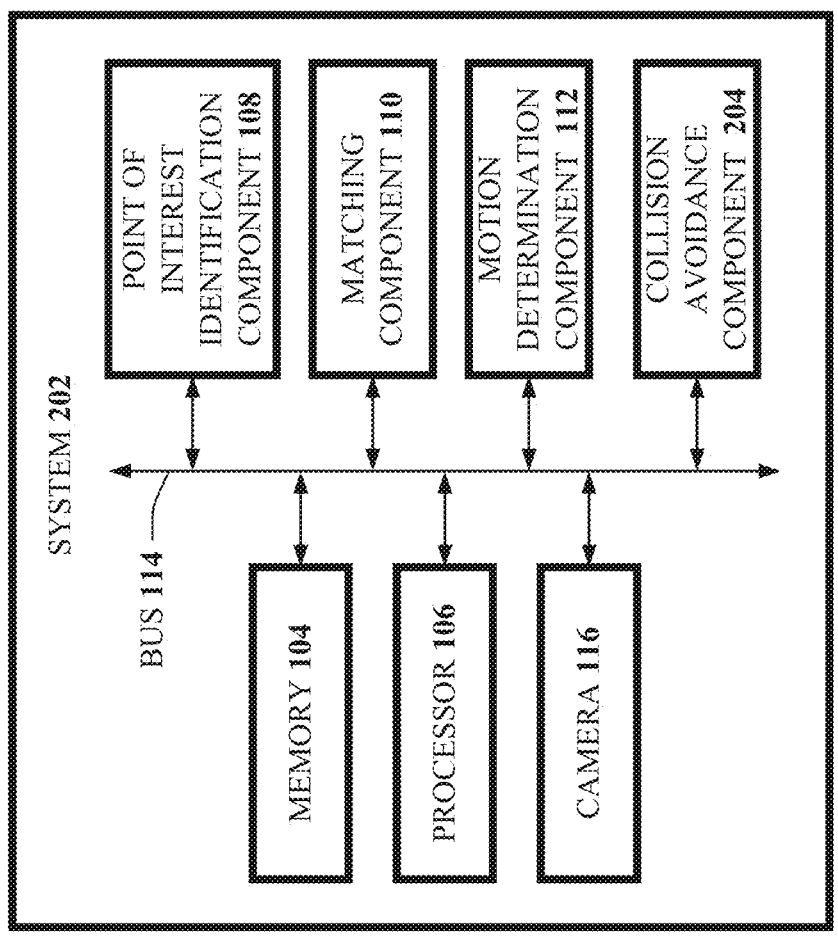
FIG. 2 illustrates a block diagram of an example, non-limiting system that can facilitate stationary object identification and collision avoidance in accordance with one or more embodiments described herein.

Turning now to FIG. 2, there is illustrated a block diagram of an example, non-limiting system 202 in accordance with one or more embodiments described herein. System 202 can be similar to system 102, and can comprise a memory 104, a processor 106, a point of interest (POI) identification (ID) component 108, a matching component 110, a motion determination component 112, a bus 114, and/or a camera 116. Repetitive description of like elements and/or processes employed in respective embodiments is omitted for sake of brevity.

System 202 can additionally comprise a collision avoidance component 204. The collision avoidance component 204 can initiate collision avoidance to avoid a stationary (e.g., fixed) object corresponding to points of interest in response to a determination by the motion determination component that the points of interest are stationary. In this regard, the collision avoidance component 204 can facilitate one or more collision avoidance actions or maneuvers, such as automatic braking to prevent an imminent impact, generating a visual warning for a predicted impact, generating a haptic feedback warning for a predicted impact, or other collision avoidance actions or warnings. Such an action or warning can depend on a defined level of imminence of a collision (e.g., whether a collision within an imminence threshold, such as within two seconds of occurring, or whether a vehicle is on a course at a different defined amount of time in the future).

The collision avoidance component 204 can utilize a vehicle trajectory projection which can be based on the front wheel angle and vehicle speed or wheel rotational velocity. Additional embodiments can also project a vehicle trajectory based on rear wheel angle (e.g., for a vehicle that can utilize rear steering in addition to front steering) and/or rear wheel rotational velocity. Based on the trajectory projection, the collision avoidance component 204 can issue a warning, prevent additional steering (e.g., by haptic feedback) towards the object, or facilitate auto-braking if the steering wheel is turned so much that the paths intersect with the object. Such an action or warning can depend on a level of imminence of a collision (e.g., whether a collision is imminent or whether a vehicle is on a course at a defined amount of time in the future). For instance, if a collision is imminent (e.g., predicted to occur within two seconds), a vehicle can commence automated braking as would be understood by one skilled in the art. If a collision is predicted to occur, but said collision is not imminent (e.g., predicted to occur in more than two seconds), a vehicle can generate a visual or audible warning. Such a warning can be broadcast over a speaker of a vehicle or can be displayed on a vehicle display (e.g., heads-up display, infotainment screen, gauge cluster, or other location) as would be understood by one skilled in the art.

In various embodiments, one or more of the memory 104, processor 106, point of interest (POI) identification (ID) component 108, matching component 110, motion determination component 112, bus 114, camera 116, and/or collision avoidance component 204 can be communicatively or operably coupled to one another to perform one or more functions of the system 202.

Figure 3:
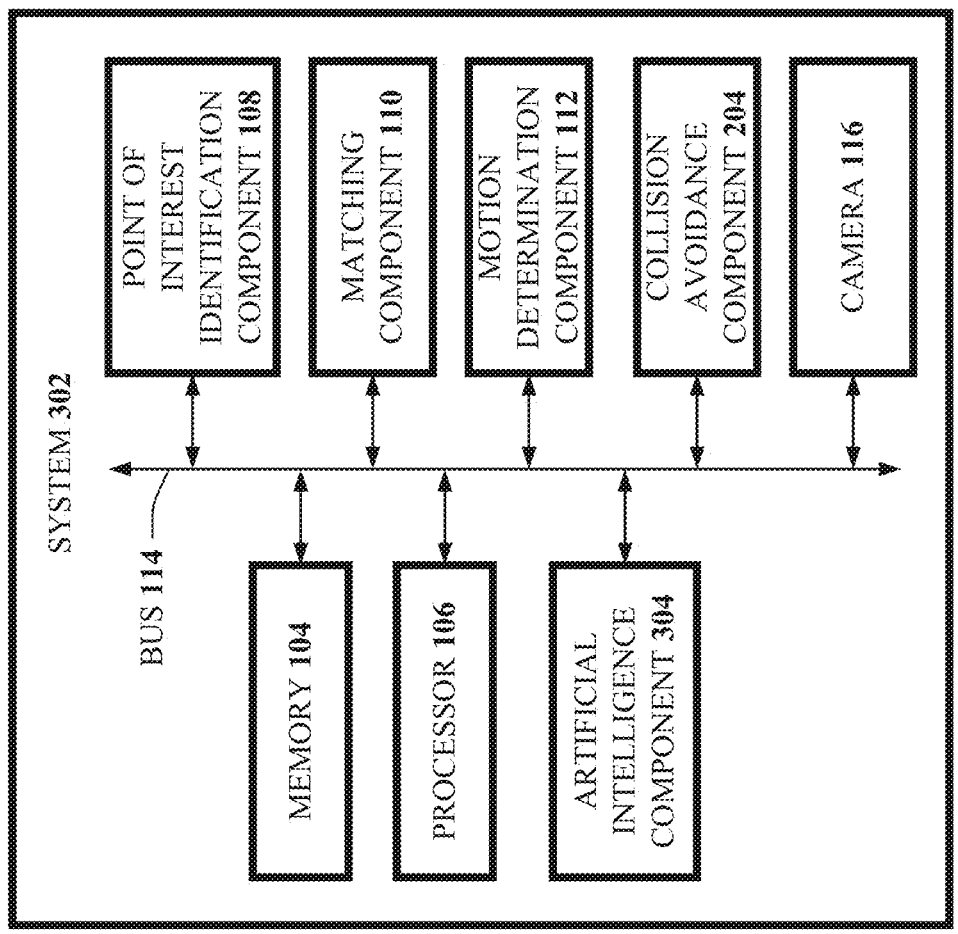
FIG. 3 illustrates a block diagram of an example, non-limiting system that can facilitate stationary object identification and collision avoidance in accordance with one or more embodiments described herein.

FIG. 3 illustrates a block diagram of an example, non-limiting system 302 in accordance with one or more embodiments described herein. System 302 can be similar to system 202, and can comprise a memory 104, a processor 106, a point of interest (POI) identification (ID) component 108, a matching component 110, a motion determination component 112, a bus 114, a camera 116, and/or a collision avoidance component 204. Repetitive description of like elements and/or processes employed in respective embodiments is omitted for sake of brevity.

System 302 can additionally comprise an artificial intelligence component 304. Artificial-intelligence or machine learning systems and techniques can be employed to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

Artificial intelligence component 304 can learn to determine points of interest comprising image coordinates in a set of images (e.g., a set of at least three images) captured by an optical camera (e.g., camera 116) of a vehicle (e.g., a moving vehicle), learn to determine whether the points of interest are stationary or in motion, learn to determine whether a multi-match exists in the set of images, learn to initiates collision avoidance to avoid a stationary object corresponding to the points of interest, and/or learn to determine an appropriate collision mitigation action in addition to other functions of the system 302. For example, artificial intelligence component 304 can comprise and/or employ an artificial intelligence (AI) model and/or a machine learning (ML) model that can learn to perform the above or below described functions (e.g., via training using historical training data and/or feedback data).

In some embodiments, artificial intelligence component 304 can comprise an AI and/or ML model that can be trained (e.g., via supervised and/or unsupervised techniques) to perform the above-described functions using historical training data comprising various context conditions that correspond to optical-camera-based collision-mitigation operations. In this example, such an AI and/or ML model can further learn (e.g., via supervised and/or unsupervised techniques) to perform the above-described functions using training data comprising feedback data, where such feedback data can be collected and/or stored (e.g., in memory 104) by artificial intelligence component 304. In this example, such feedback data can comprise the various instructions described above/below that can be input, for instance, to a system 302, over time in response to observed/stored context-based information. In some embodiments, based on learning to perform the functions described above, artificial intelligence component 304 can perform such functions in the same manner and/or using the same resources as that of point of interest (POI) identification (ID) component 108, matching component 110, motion determination component 112, bus 114, camera 116, and/or collision avoidance component 204.

Artificial intelligence component 304 can initiate an operation associated with a vehicle based on a defined level of confidence determined using information (e.g., feedback data) acquired from, for instance, a camera 116. For example, based on learning to perform such functions described above using the above defined feedback data, artificial intelligence component 304 can initiate an operation associated with the vehicle if it determines, based on such feedback data, that a collision with a stationary object may occur. For instance, based on learning to perform such functions described above using the above defined feedback data, artificial intelligence component 304 can determine appropriate actions in response to a determination that a collision with a stationary object will occur or might occur.

In an embodiment, artificial intelligence component 304 can perform a utility-based analysis that factors cost of initiating the above-described operations associated with the vehicle versus benefit. In this embodiment, artificial intelligence component 304 can use one or more additional context conditions to determine whether a current collision avoidance action should be taken. Such context conditions can comprise vehicle information such as (but not limited to) wheel rotation speed (e.g., vehicle speed) and wheel angle (e.g., steering angle).

To facilitate the above-described functions, artificial intelligence component 304 can perform classifications, correlations, inferences, and/or expressions associated with principles of artificial intelligence. For instance, artificial intelligence component 304 can employ an automatic classification system and/or an automatic classification. In one example, artificial intelligence component 304 can employ a probabilistic and/or statistical-based analysis (e.g., factoring into the analysis utilities and costs) to learn and/or generate inferences. Artificial intelligence component 304 can employ any suitable machine-learning based techniques, statistical-based techniques and/or probabilistic-based techniques. For example, artificial intelligence component 304 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, artificial intelligence component 304 can perform a set of machine learning computations. For instance, artificial intelligence component 304 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In various embodiments, one or more of the memory 104, processor 106, point of interest (POI) identification (ID) component 108, matching component 110, motion determination component 112, bus 114, camera 116, collision avoidance component 204, and/or artificial intelligence component 304 can be communicatively or operably coupled to one another to perform one or more functions of the system 302.

Figure 4A:
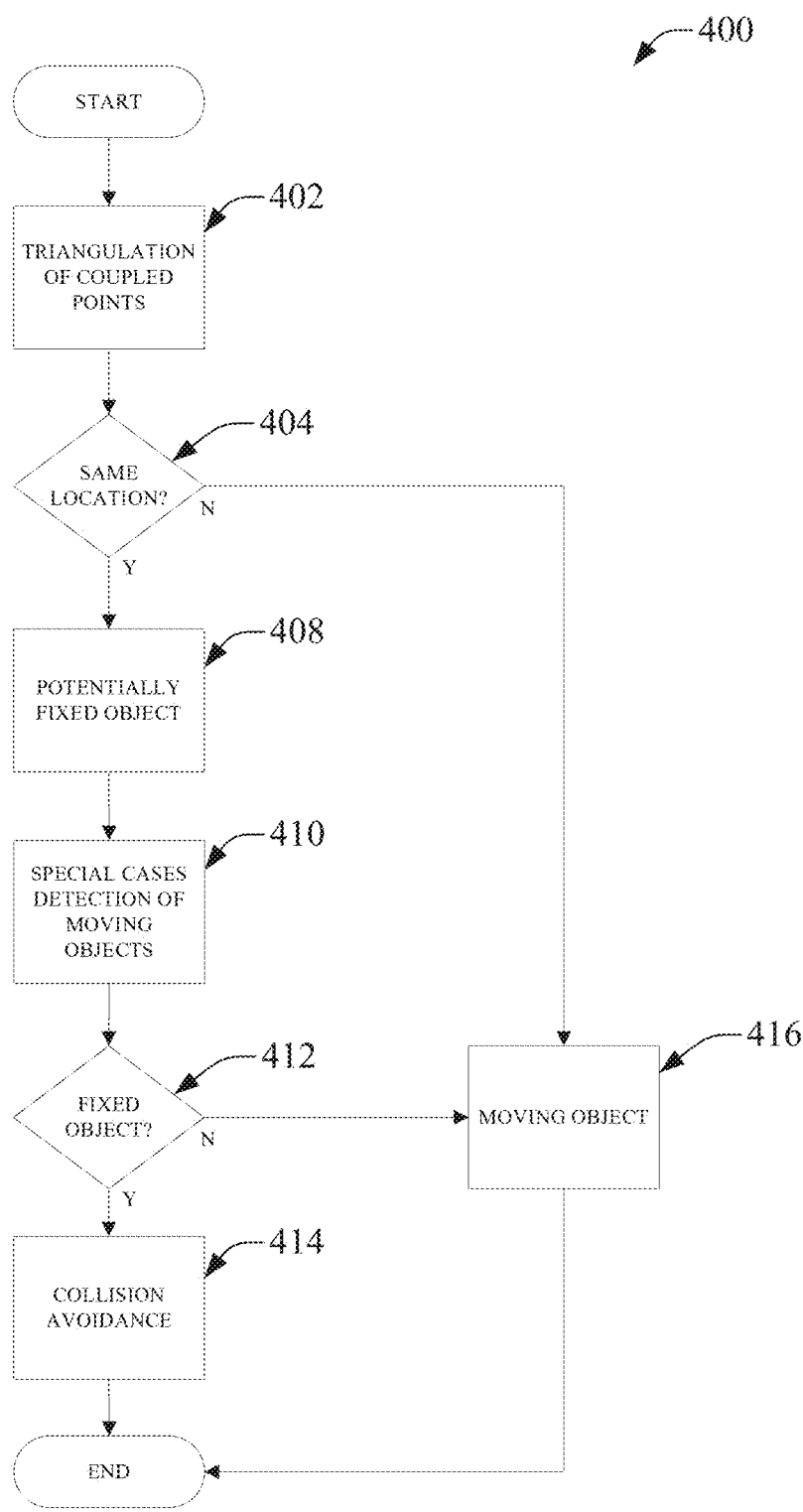
FIGS. 4A-4C illustrate a flow charts of example, non-limiting processes for stationary object collision avoidance in accordance with one or more embodiments described herein.

FIG. 4A illustrates a flow chart of an example, non-limiting process 400 for stationary object identification and collision avoidance in accordance with one or more embodiments described herein. At 402, triangulation of coupled points (e.g., from three image frames) can be performed. This triangulation at 402 is discussed in greater detail in FIG. 4B. At 404, if coupled points (e.g., a multi-pair or multi-match such as a triple-match or other combination) exist, then the points are deemed to correspond to a potentially fixed (e.g., potentially stationary) object at 408. The object is considered potentially stationary here because the potentially fixed object could still be in motion if it is identified as stationary based on false-positive identification, which can occur prior to special case detection or matching. If at 404, the points to not correspond to the same location, the points are deemed to correspond to a moving object at 416 and the process can end, as according to an embodiment, the process 400 is configured for avoidance of stationary objects, not moving objects. At 410, the potentially fixed object from 408 is subjected to a special case detection of moving objects. Special case testing can comprise subjecting 3D positions (corresponding to the potentially stationary object) to a series of defined special cases. Such defined special cases are provided in FIGS. 13-17. At 412, if the potentially fixed object is determined to be a moving object, based on comparison with the special cases, the points are deemed to correspond to a moving object at 416 and the process can end. If at 412, the potentially fixed object is determined to be a fixed object, based on comparison with the special cases, a collision avoidance procedure can be facilitated at 414. Collision avoidance at 414 is discussed in greater detail in FIG. 4C.

Figure 4B:
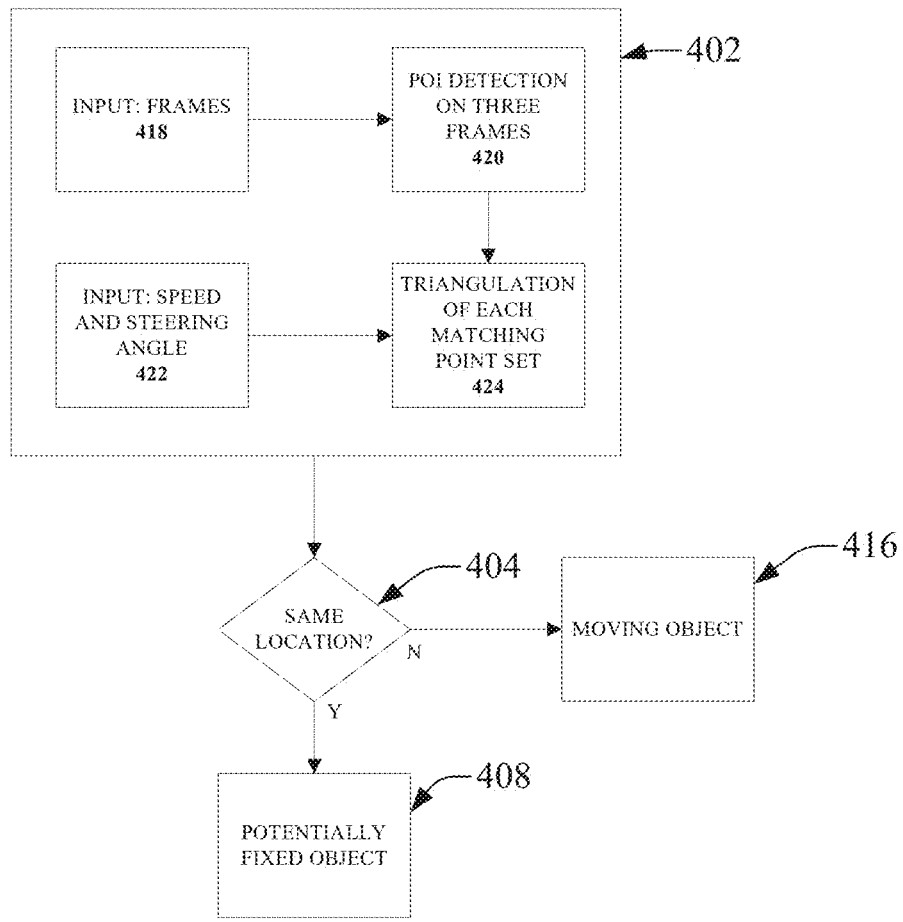

FIG. 4B illustrates a flow chart of exemplary triangulation of coupled points. At 402, triangulation of coupled points (e.g., in three frames) can be performed. 402 can comprise utilizing frames at 418 (e.g., from a camera 116) as an input to POI detection on the frames (e.g., at least three frames) at 420. POI detection can utilize, for instance, Scale Invariant Feature Transformation (SIFT) or Compact Descriptors for Visual Search (CDVS). Triangulation on each matching point set of POIs can be performed at 424, using associate vehicle speed and vehicle steering angle as inputs from 422 and the POI detection from 420.

Figure 4C:
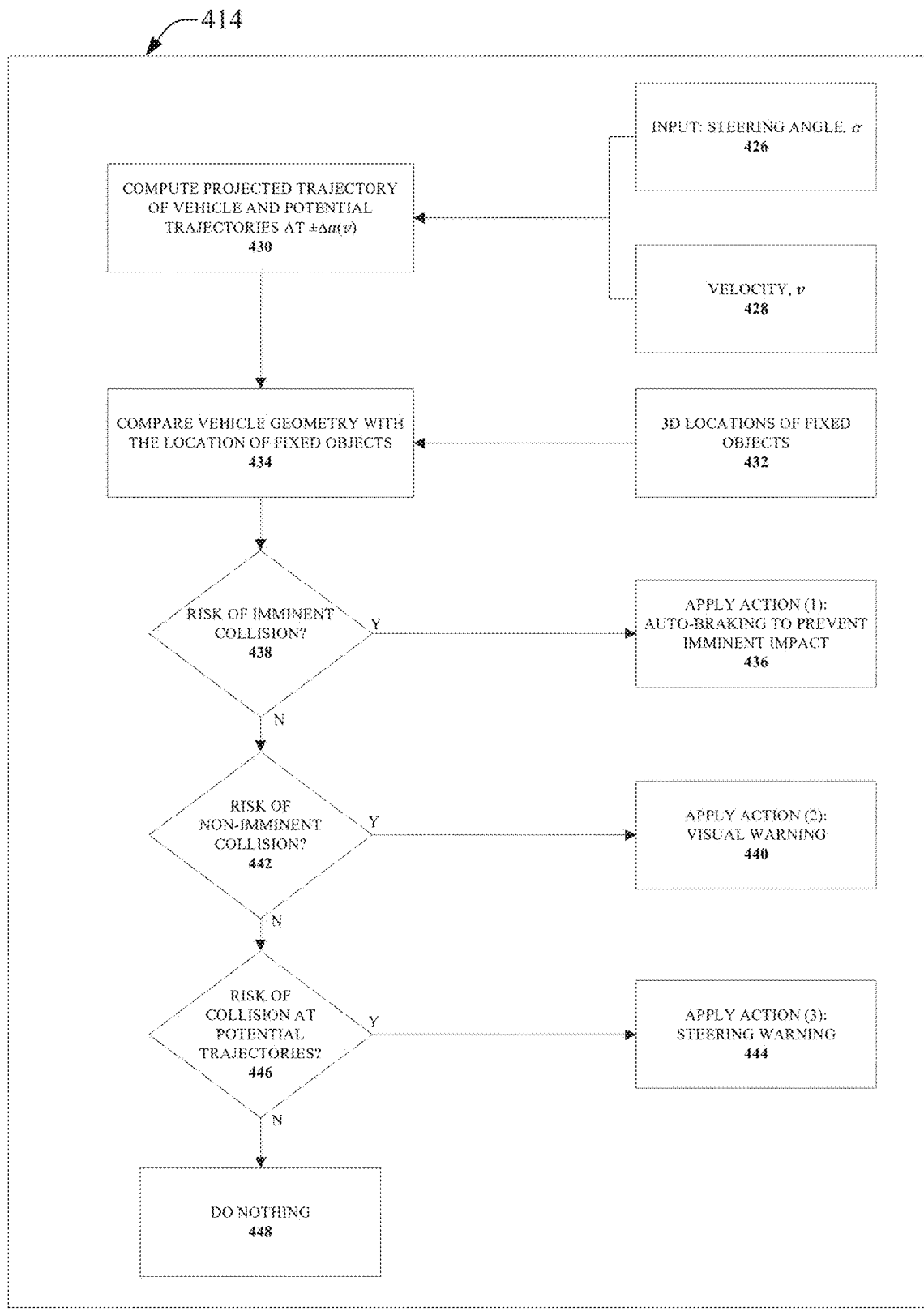

FIG. 4C illustrates a flow chart of exemplary collision avoidance 414. Steering angle α at 426 and velocity v at 428 can be input to 430, where a trajectory of a vehicle and potential trajectories $\pm\Delta\alpha(v)$ of said vehicle are determined or computed. According to an embodiment, the potential change in steering angle $\Delta\alpha(v)$ can be smaller at larger velocities. In this regard, the expected $\pm\Delta\alpha(v)$ can be smaller at higher velocity. Stated otherwise, steering angles tend to be smaller at higher velocities. Consequently, sharper turns are not considered for collision avoidance at high velocities. Velocity can also help determine a degree of imminence of a collision (e.g., velocity can help determine time required to cover a distance which can lead to a collision). Speed At 434 vehicle geometry (e.g., vehicle location and trajectory) is compared with the 3D location(s) of fixed object(s) as received from 432 (at 432, 3D locations of fixed objects are determined). Such 3D locations can be determined as according to 402 in FIGS. 4A and 4B. At 438, if a collision risk is imminent based on the comparison at 434, automated braking to prevent an imminent impact can be facilitated at 436. An imminent collision can comprise a predicted future collision that is predicted to occur within a defined amount of time (e.g., within two seconds). If the risk of a collision is predicted but not imminent at 438 (e.g., predicted to occur but not within the aforementioned defined amount of time), there occurs a determination regarding whether there exists a risk of a non-imminent collision at 442. If there is a risk of a collision (but not an imminent risk), a visual warning can be generated at 440. A visual warning can comprise a message or alert in a heads-up display, infotainment screen, gauge cluster or digital gauge cluster, or another screen inside an associated vehicle. Such a warning can be broadcast over a speaker of a vehicle or can be displayed on a vehicle display (e.g., heads-up display, infotainment screen, gauge cluster, or other location) as would be understood by one skilled in the art. If at 442 there is not a risk of a collision on a current trajectory, there is a determination of whether there exists a risk of a collision at potential trajectories at 446. Potential trajectories can comprise a trajectory that a vehicle is not currently undertaking but could in the future, depending on driver input. Stated otherwise, a potential trajectory can comprise a trajectory if a driver makes a steering change. If there is a risk of a collision at potential trajectories at 446, a steering warning can be applied at 444. A steering warning can comprise, for instance, haptic feedback (e.g., in a steering wheel or a seat of an associated vehicle). According to an embodiment, haptic feedback can be applied if a driver of a vehicle turns toward a potential collision trajectory. Said haptic feedback can therefore alert or inform said driver not to engage in such a collision-course trajectory. If at 446, there is not a risk of a collision at potential trajectories, then nothing occurs at 448.

Figure 5A:
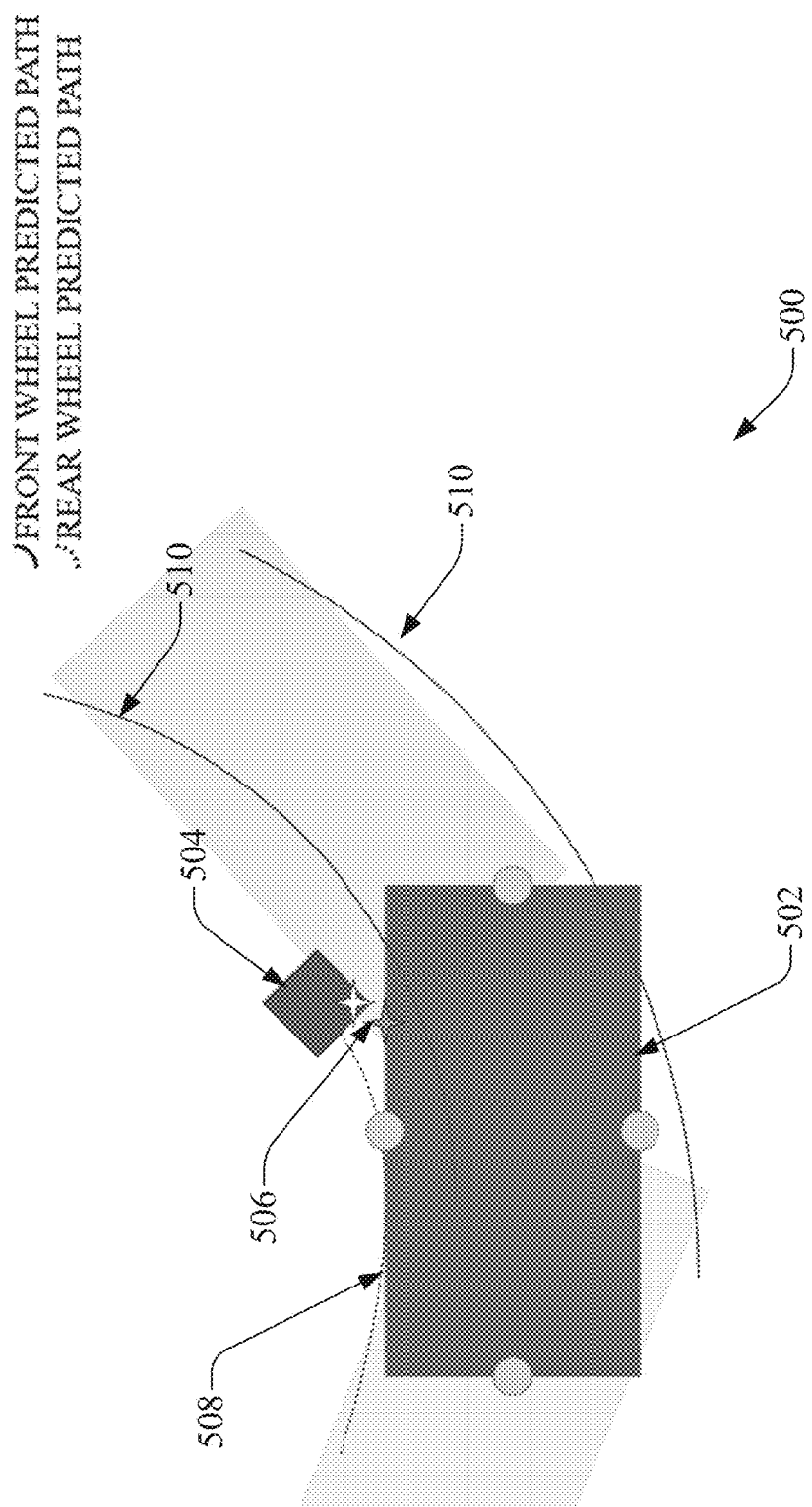

Turning now to FIG. 5A, there is illustrated a diagram of exemplary automated-braking scenario 500 in accordance with various embodiments described herein. As described, auto-braking can be utilized for a collision determined to be imminent (e.g., by a collision avoidance component 204). As shown in FIG. 5A, a front wheel predicted path 510 of a vehicle 502 can avoid an object 504. However, a rear wheel predicted path 508 of the vehicle 502 can be on an imminent collision course with an object 504. The imminent collision can be predicted to occur at 506. In this scenario, automated braking can be facilitated by the vehicle 502 so that the imminent collision 506 does not occur.

Figure 5B:
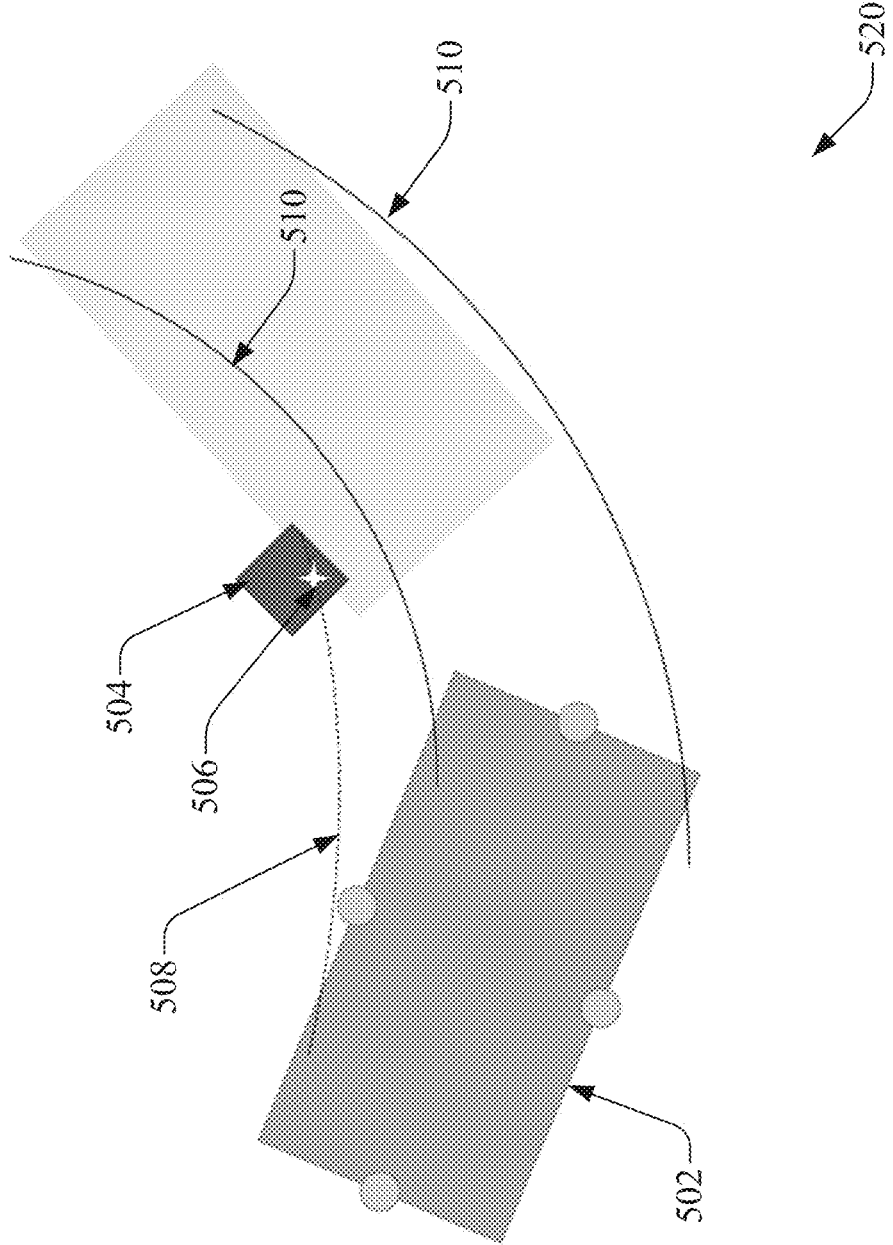

With reference to FIG. 5B, there is illustrated a diagram of an exemplary visual warning scenario 520 in accordance with various embodiments described herein. As described, a warning (e.g., a visual warning and/or an audible warning) can be provided (e.g., by the collision avoidance component 204) for a collision determined to be not imminent. As shown in FIG. 5B, a front wheel predicted path 510 can avoid an object 504. However, a rear wheel predicted path 508 of the vehicle 502 can be on a collision course with an object 504, though in this scenario 520 the collision is not imminent (e.g., not within a defined imminent collision threshold). The non-imminent collision can be predicted to occur at 506. In this scenario, a visual warning can be generated by the vehicle 502 so that a driver of the vehicle 502 is warned of the collision 506.

Turning now to FIG. 5C, there is illustrated a diagram of an exemplary steering warning scenario 530 in accordance with various embodiments described herein. As described, potential trajectories can comprise a trajectory that a vehicle is not currently undertaking but could in the future depending on driver input. If there is a risk of a collision at potential trajectories, a steering warning can be applied. As shown in FIG. 5C, a front wheel predicted path 510 can avoid an object 504. A rear wheel predicted path 508 of the vehicle 502 can also avoid the object 504. However, a sharper left-hand turn of the vehicle 502 can cause the vehicle 502 to become on a trajectory that would result in a collision at 506. Therefore, a potential trajectory for a collision exists. If a driver of the vehicle 502 attempts to turn sharper to the left (in this nonlimiting example), haptic feedback can be applied (e.g., in an associated steering wheel) so that the driver is warned to not take such a turning trajectory and thus avoid the collision at 506.

Figure 6:
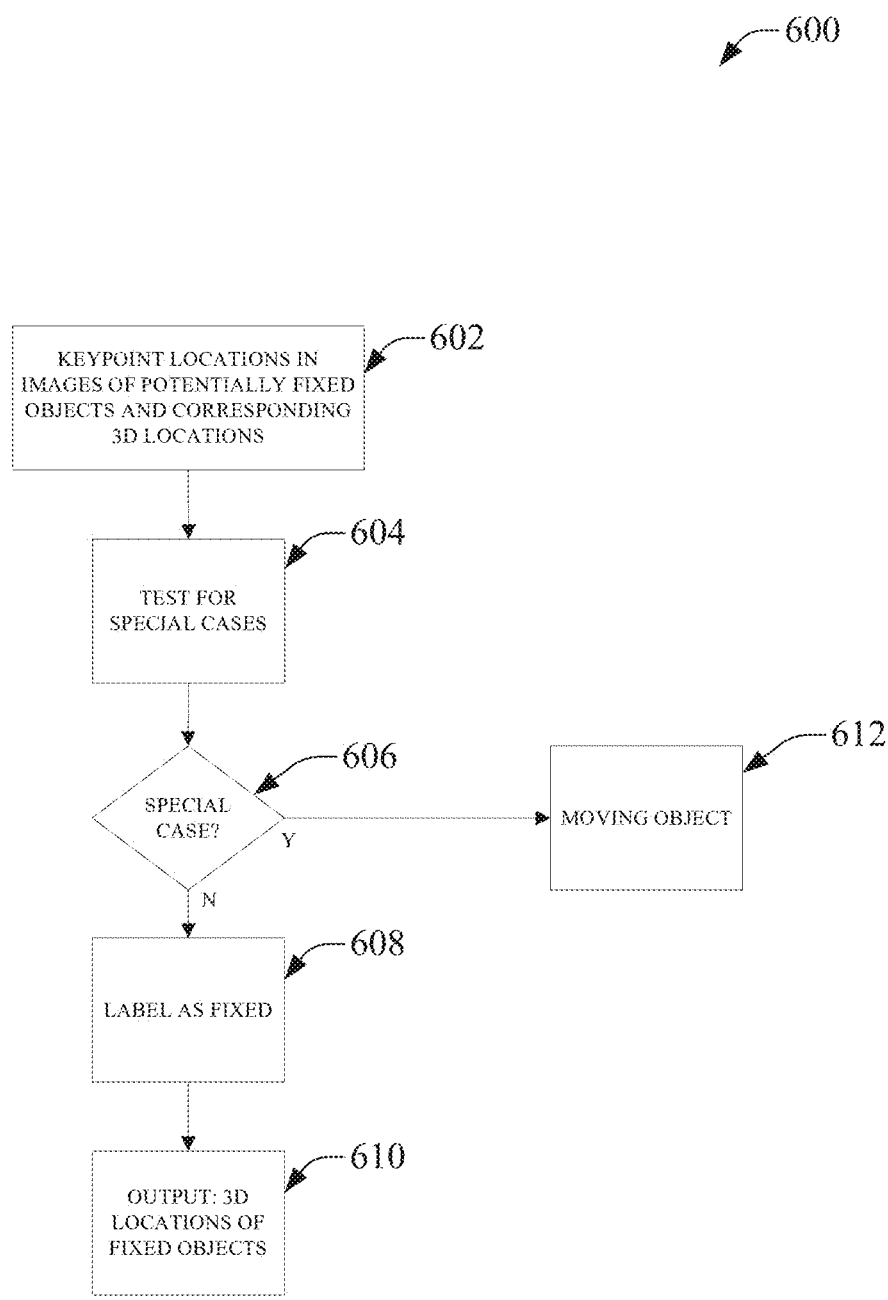
FIG. 6 illustrates a flow chart of an example, non-limiting process for stationary object identification and collision avoidance in accordance with one or more embodiments described herein.

FIG. 6 illustrates a flow chart of an example, non-limiting flowchart of a process 600 for special case detection of moving objects in accordance with one or more embodiments described herein. At 602, keypoint (e.g., POI) locations in images of potentially fixed objects and corresponding 3D locations are determined. At 604, defined special cases are tested (exemplary defined special cases are later discussed in greater detail). At 606, if a potentially fixed objects matches a special case, the objected is deemed a moving object at 612 and is thus not considered for the purposes of stationary object collision warning or avoidance. If the potentially fixed object does not match a special case, the potentially fixed object is deemed a fixed object at 608. At 610, 3D locations of the fixed objects are output (e.g., to a collision avoidance component 204).

Figure 7:
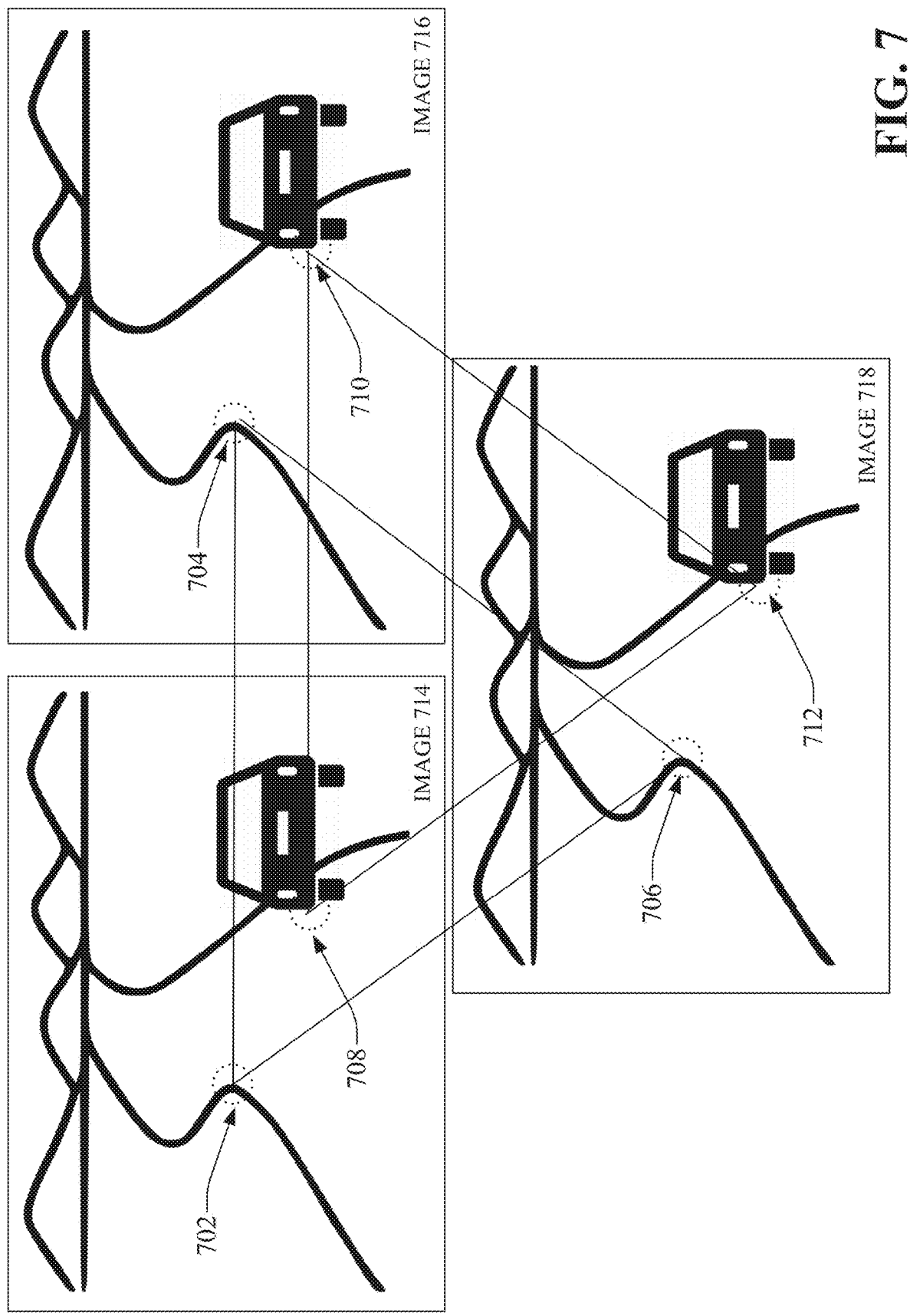
FIGS. 7-9 illustrate diagrams of exemplary, non-limiting stationary object point of interest detection and matching techniques in accordance with one or more embodiments described herein.
Figure 8:
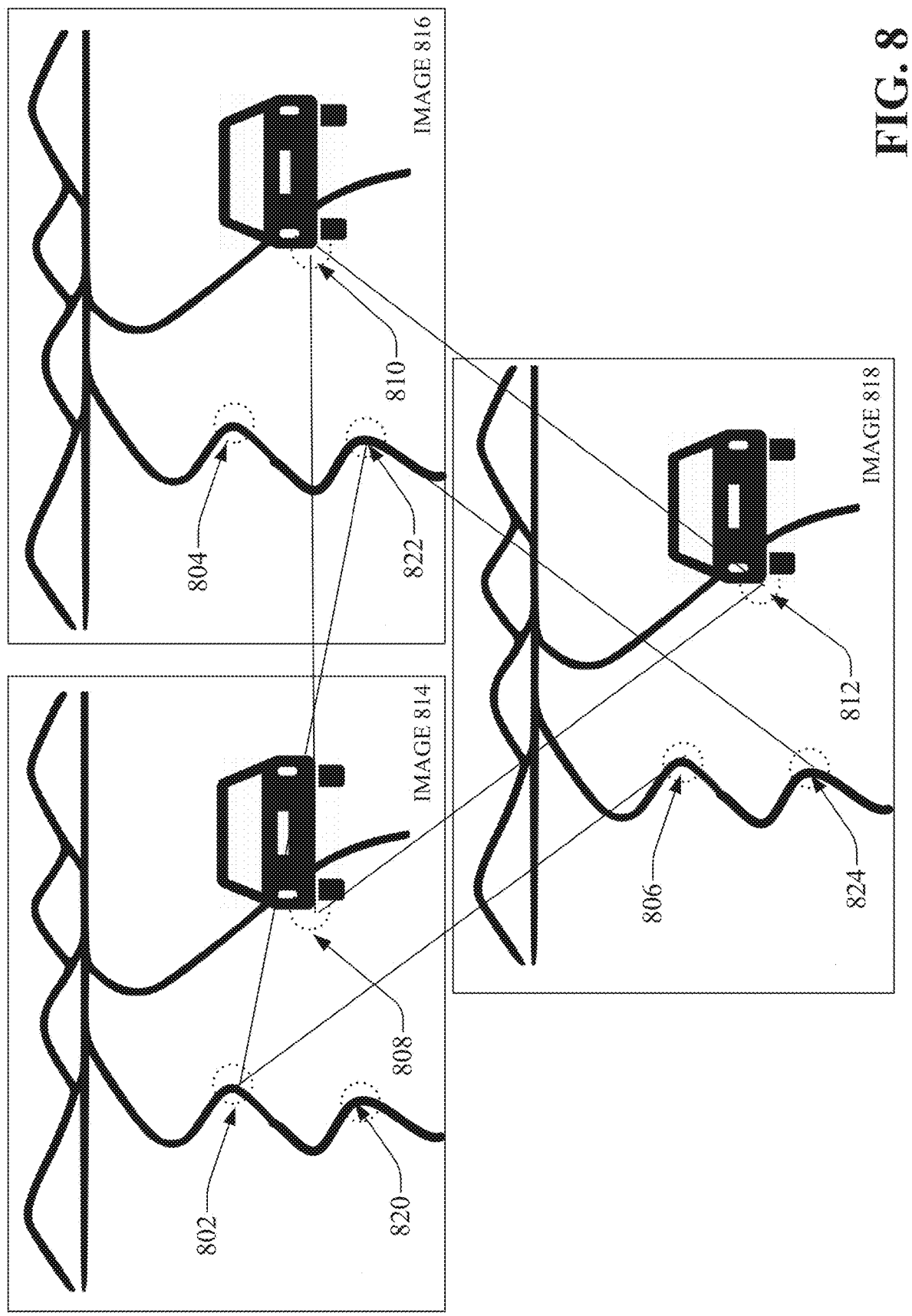

FIGS. 7 and 8 illustrate POI matching in accordance with various embodiments described herein. In FIG. 7, two sets of triple-pairs exist. For instance, POI 702 in image 714, POI 704 in image 716, and POI 706 in image 718 all correspond to common locations among the three images. Similarly, POI 708 in image 714, POI 710 in image 716, and POI 712 in image 718 all correspond to common locations among the three images.

In FIG. 8, POI 808 in image 814, POI 810 in image 816, and POI 812 in image 818 all correspond to common locations among the three images. Therefore, a multi-match (in this example, a triple-match) exists for these points. However, while POI 802 in image 814 corresponds to POI 806 in image 818, and POI 822 in image 816 corresponds to POI 824 in image 818, POI 824 does not correspond to POI 802 and POI 806 does not correspond to POI 822. Accordingly, a triple-match does not exist for these POI's, and they are accordingly rejected and not considered for determining a 3D location of an object. Even if one of POI 802 or POI 804 match with POI 806, this is not a triple-pair. It can be appreciated that the foregoing represents an exemplary triple-match though other combinations can be utilized. For instance, according to an embodiment, POI 804 can be extrapolated (e.g., by matching component 110) based on POI 802 and POI 806 in the case of a double-match. In other embodiments, a quadruple or further matches can be required.

Figure 9:
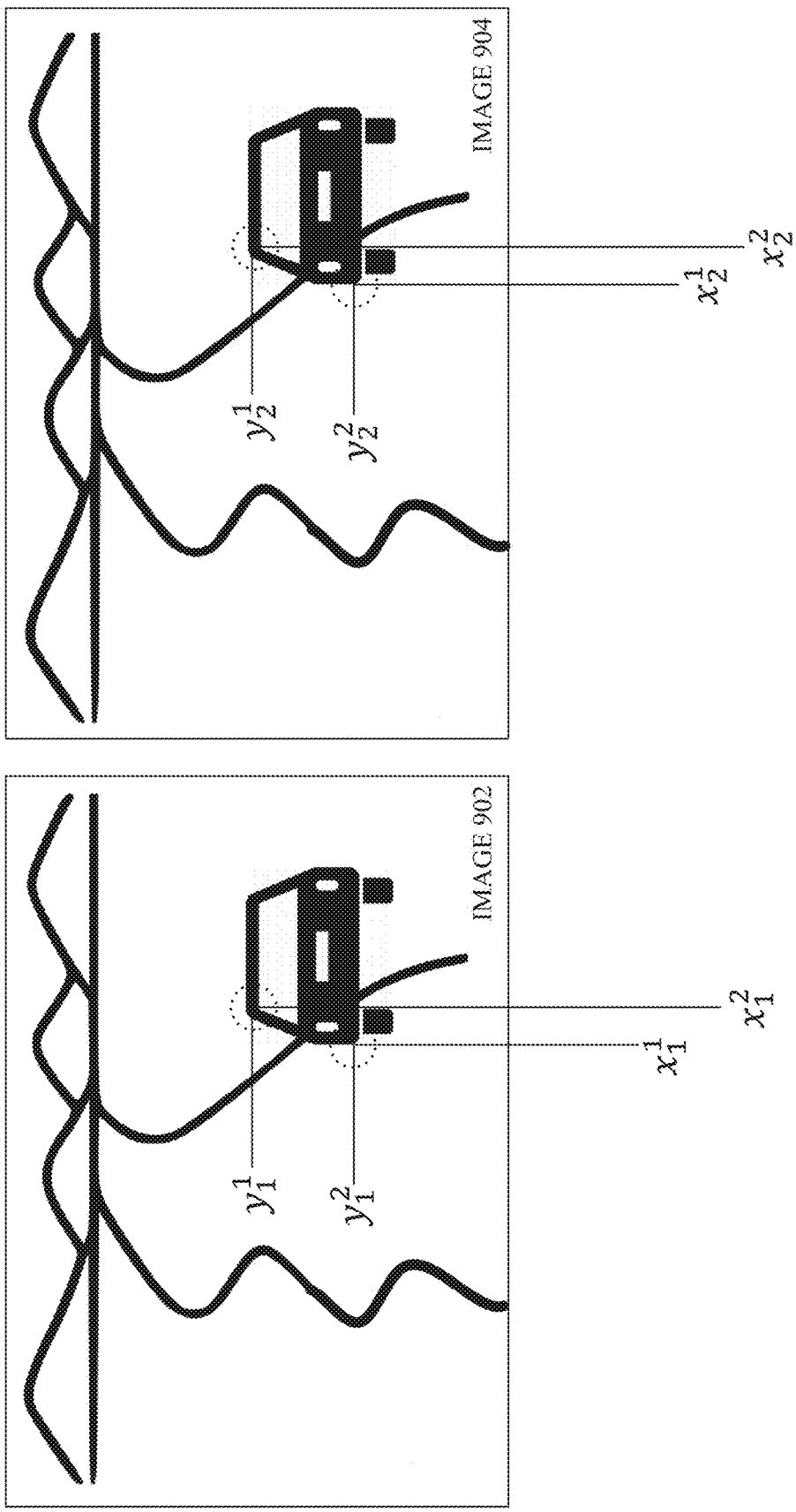

FIG. 9 illustrates 3D location calculation in accordance with various embodiments described herein. Image 902 and image 904 can be calibrated images, such that each row and each column corresponds to a vertical and horizontal viewing angle, respectively, then X and Y values can be converted to angles, and 3D points can be calculated using stereo image reconstruction (e.g., see FIG. 10). In stereo triangulation, when an object P is located in two cameras ($C_1$ and $C_2$) and the position of the cameras relative to each other is known (T), then the distance to P can be calculated through triangulation. In this regard, triple-pairs can be utilized to determine object location (e.g., using triple-matching) and remove false positives (e.g., with special case matching), though it can be appreciated that other combinations such a double-matches or quadruple matches (or further combinations) can be utilized. According to an embodiment, pixel coordinates can be converted to angles using camera calibration. In this regard, when an image is calibrated (e.g., rectified), all pixels in a column (or row) can possess the same lateral angular deviation (or vertical for rows) from an optical axis (e.g., the vector from the center of the camera pointing to the center of where it is aiming).

Figure 10:
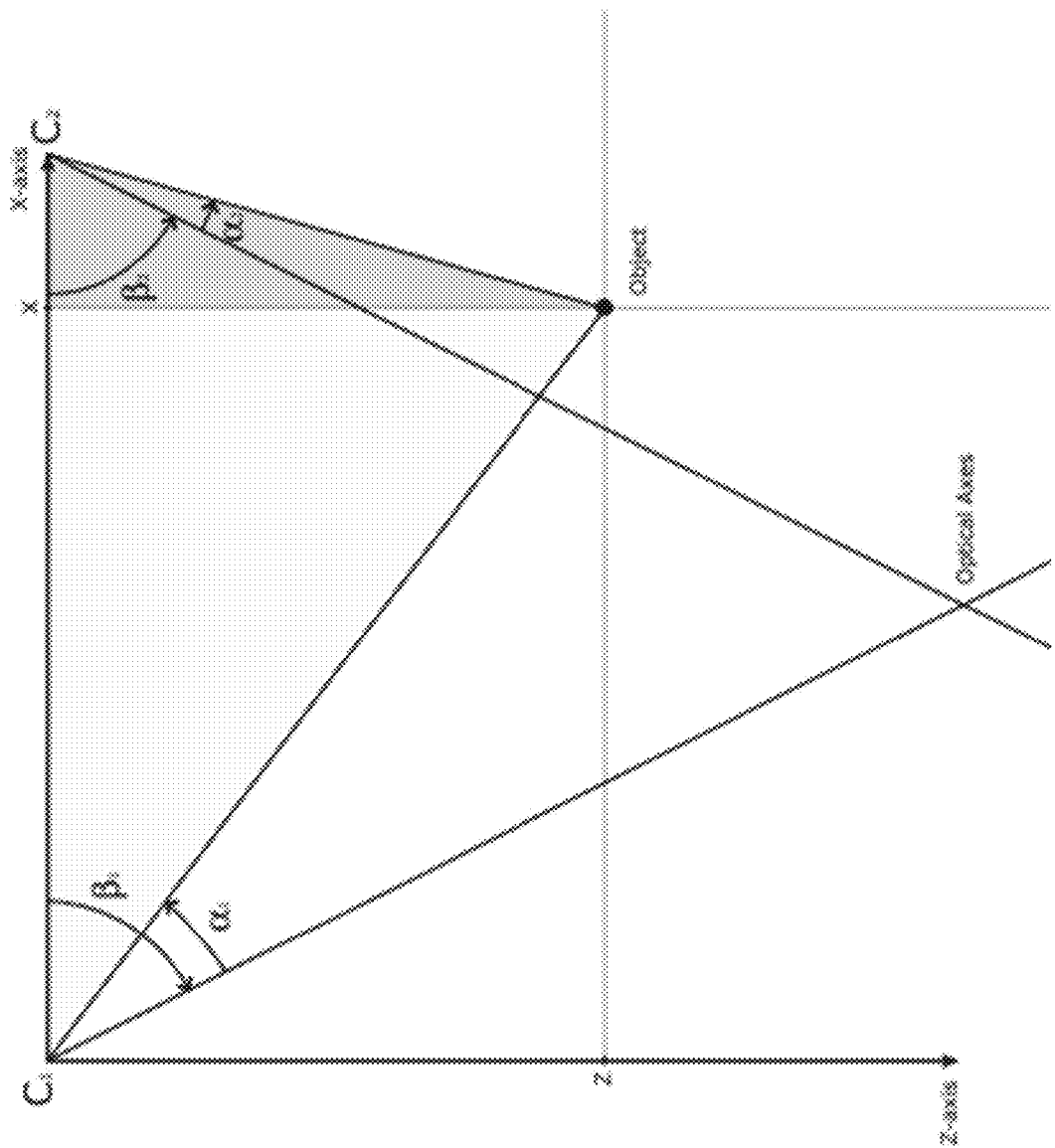
FIG. 10 illustrates a diagram of an exemplary, non-limiting stereo location identification in accordance with one or more embodiments described herein.

FIG. 10 illustrates exemplary stereo triangulation in accordance with various embodiments herein. In this non-limiting example, only $\alpha_1$ is negative and positive direction of all angles can be out from the X-axis with the solution:

$$\begin{cases} X = \left(\frac{\tan(\alpha_1 + \beta_1)}{\tan(\alpha_2 + \beta_2)} + 1\right)^{-1} \\ Z = X \tan(\alpha_1 + \beta_1) \end{cases} \quad \text{(Eq. 1)}$$

In this example, $O_1$ can be the angle of the projection on the plane spanned by the Y-axis and the optical axis of camera $C_1$. The object's distance can be first projected on the optical axis before a triangle similar to the two equations used to calculate Z and X yield an equation to determine Y. This projection can be the denominator in the following equation:

$$\tan(O_1) = \frac{Y}{\sqrt{(X^2 + Z^2)}\cos(\alpha_1)} \quad \text{(Eq. 2)}$$

It is noted that $O_1$ is not used yet and may not need to be used since the last coordinate, Y, can be calculated only from Eq. 2. Using camera $C_2$ yields the following equation:

$$\tan(O_2) = \frac{Y}{\sqrt{(X-1)^2 + Z^2}\cos(\alpha_2)} \quad \text{(Eq. 3)}$$

Average Y can be derived from Eq. 2 and Eq. 3:

$$Y = \frac{\sqrt{(X^2 + Z^2)}\cos(\alpha_1)\tan(O_1) + \sqrt{(X-1)^2 + Z^2}\cos(\alpha_2)\tan(O_2)}{2} \quad \text{(Eq. 4)}$$

In this regard:

$$\begin{cases} X = \left(\frac{\tan(\alpha_1 + \beta_1)}{\tan(\alpha_2 + \beta_2)} + 1\right)^{-1} & \text{(Eq. 5)} \\ Y = \dfrac{\sqrt{(X^2 + Z^2)}\cos(\alpha_1)\tan(O_1) + \sqrt{(X-1)^2 + Z^2}\cos(\alpha_2)\tan(O_2)}{2} \\ Z = X \tan(\alpha_1 + \beta_1) \end{cases}$$

Figure 11:
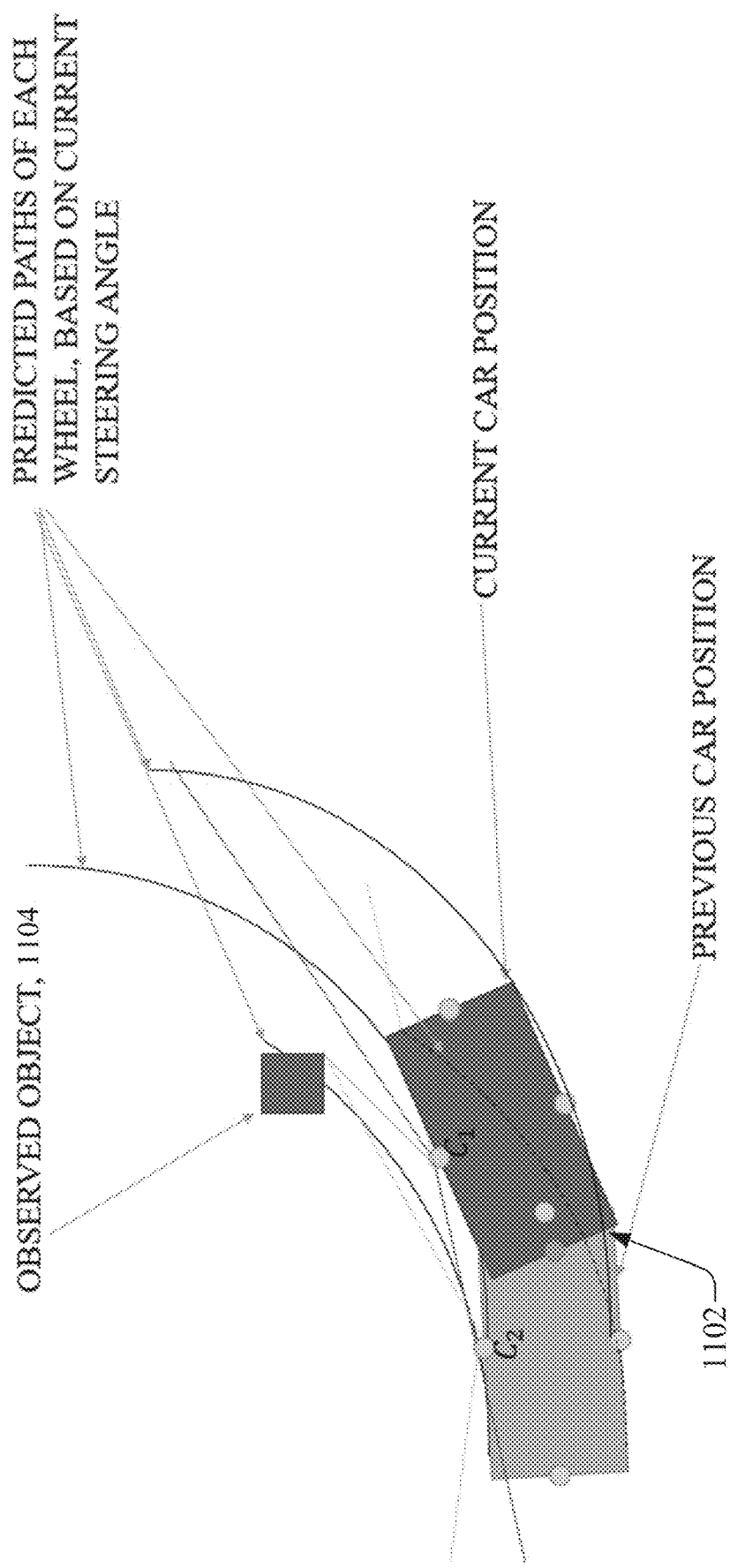
FIG. 11 illustrates a diagram of an exemplary, non-limiting triangulation of fixed objects over time in accordance with one or more embodiments described herein.
Figure 12:
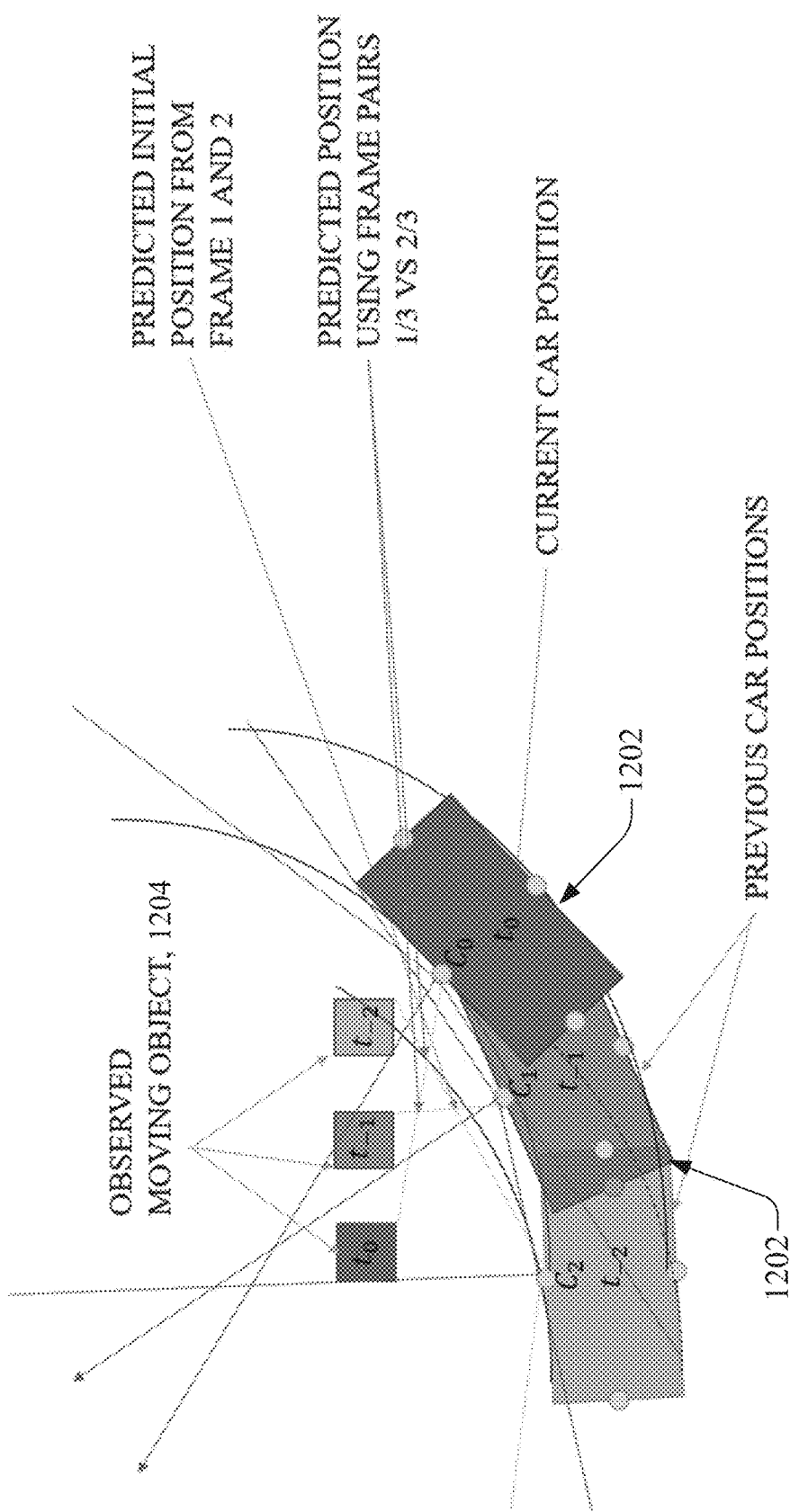
FIG. 12 illustrates a diagram of an exemplary, non-limiting triangulation of moving objects over time in accordance with one or more embodiments described herein.

FIG. 11 illustrates exemplary triangulation of a fixed object 1104 over time with respect to a vehicle 1102, and FIG. 12 illustrates exemplary triangulation of a moving object 1204 over time with respect to a vehicle 1202.

FIGS. 13-17 illustrate exemplary defined special cases in which an object (e.g., a potentially fixed object) appears as a stationary object, but is actually a false positive, thus representing a moving object. The special cases can be tested so that false positive results can be identified and moving objects can be discarded from further analysis and/or subsequent actions (e.g., collision avoidance).

Figure 13:
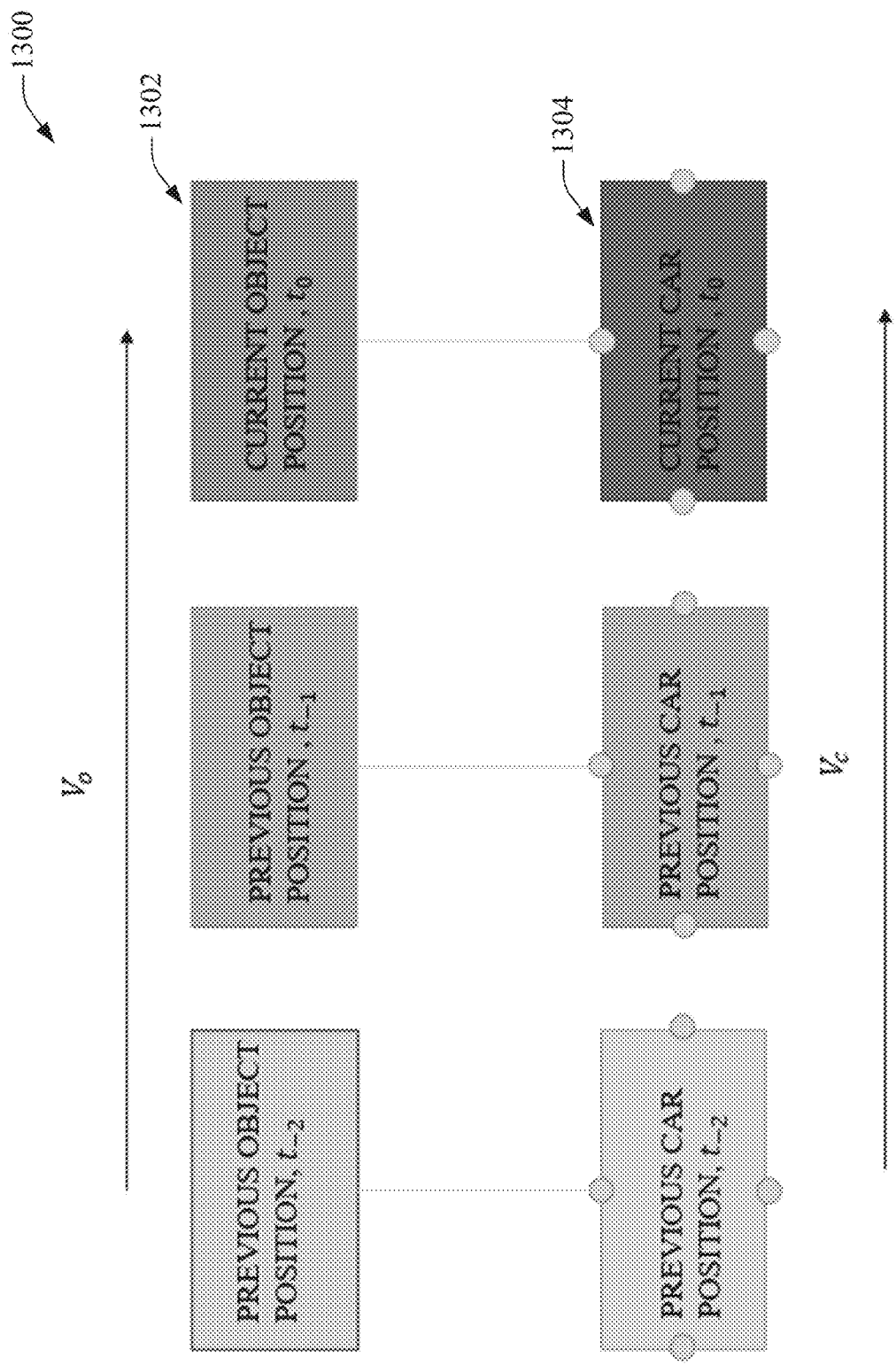
FIG. 13 illustrates a diagram of an exemplary, non-limiting special case in accordance with one or more embodiments described herein.

FIG. 13 illustrates a special case 1300 in which an object 1302 and a car 1304 move in parallel in the same direction. When $V_o = V_c$, the perceived fixed location is ∞. When a special case 1300 is encountered, no collision avoidance action is needed. In this regard, multipoint detection reveals constant scale (e.g., object is maintaining a constant, but unknown distance). In this regard, multiple points of interest can correspond to a single object and a scale of said object can be determined over time, for instance, between a set of three images or more by connecting backwards to previous iterations further back in time that have already been fully processed. However, because distance is constant, no collision avoidance action (e.g., mitigation) is needed. Consequently, the object can be properly treated as a moving object and can thus be ignored or rejected.

Figure 14A:
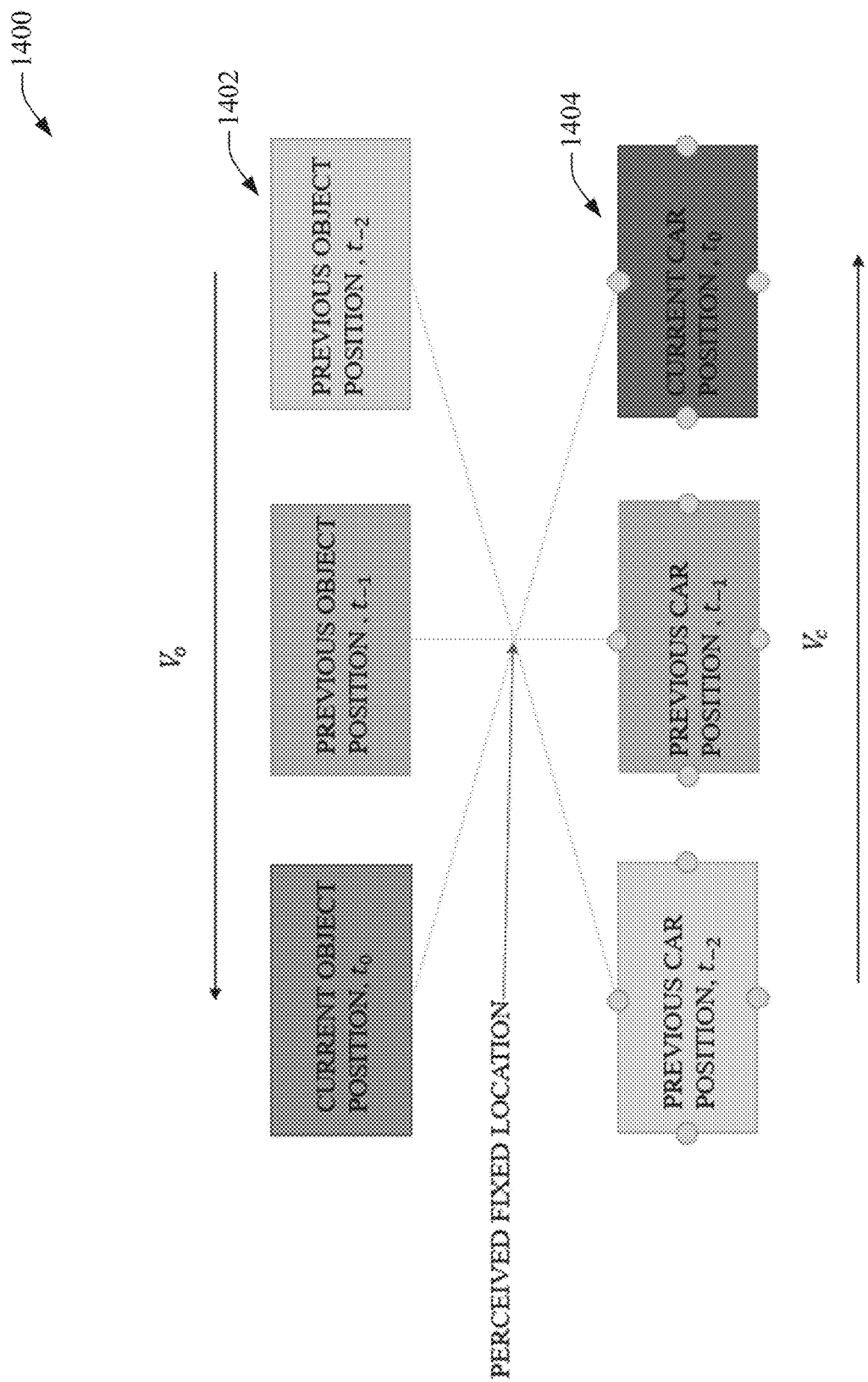
FIGS. 14A-14D illustrate diagrams of exemplary, non-limiting special cases in accordance with one or more embodiments described herein.
Figure 14B:
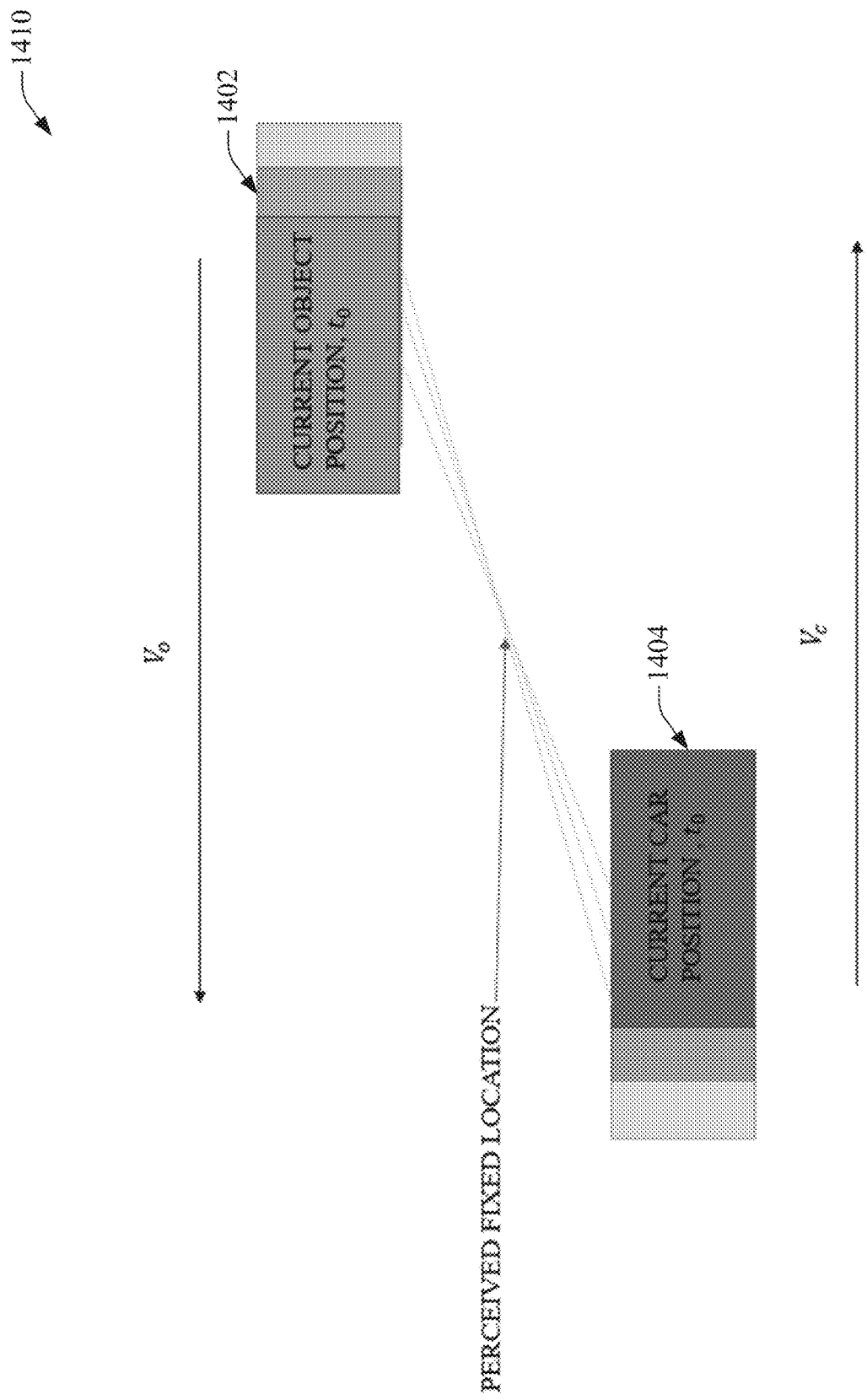
Figure 14C:
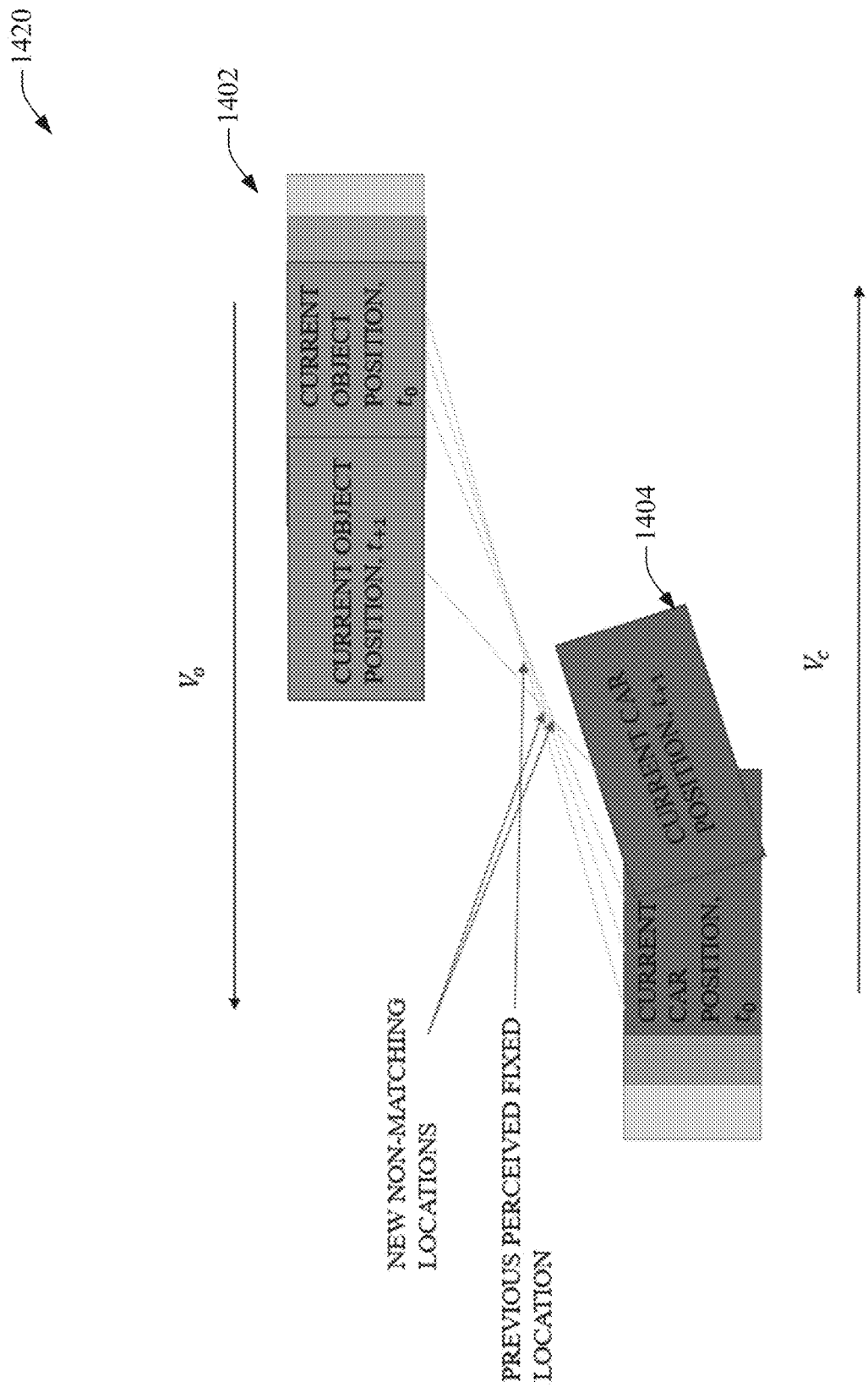
Figure 14D:
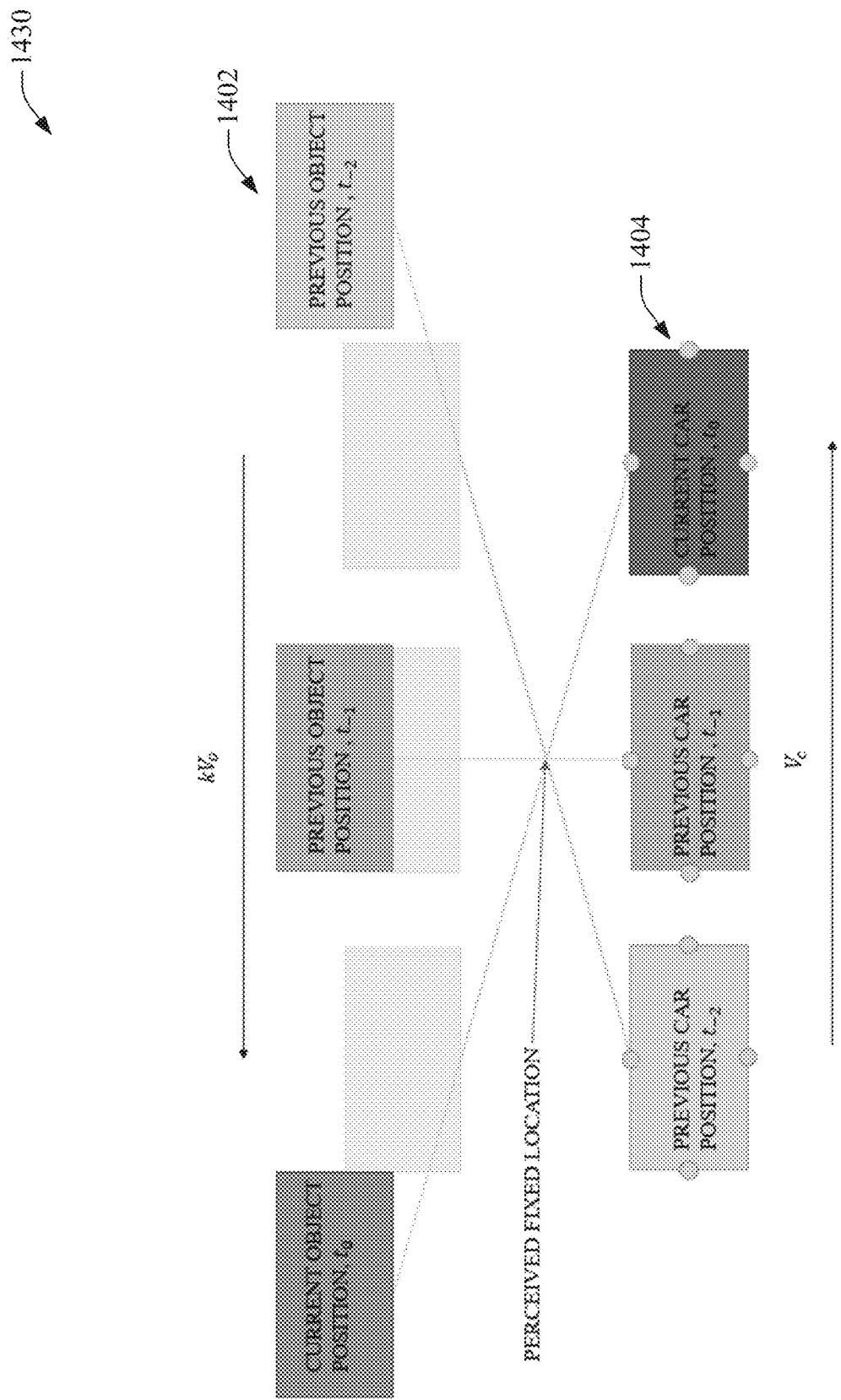

FIGS. 14A-14D refer to special cases in which a car 1404 (e.g., a vehicle) and an object 1402 move in opposite directions in parallel. FIG. 14A illustrates a special case 1400 in which an object 1402 and a car 1404 move in parallel, opposite directions at constant speed. In this special case 1400, when $V_o = -V_c$, an object is detected as a fixed object closer than it actually is. However, no collision avoidance action (e.g., mitigation or warning) is needed because the steering angle of the car 1404 causes the car 1404 to possess a trajectory that would not cause the car 1404 to collide with the object 1402, even if the object 1402 is incorrectly perceived as closer than it actually is (as is the case in special case 1400). FIG. 14B illustrates a special case 1410 which is similar to special case 1400. In special case 1410, object 1402 is farther ahead than in special case 1400. In special case 1410, object 1402 is again perceived as closer than it actually is. Here, no action is needed due to a steering angle of the car 1404 (moving in parallel would not cause a collision with the object 1402). However, if steering angle were to change, as illustrated in special case 1420 in FIG. 14C, a car 1404 could begin to travel toward an object 1402. Nonetheless, when $V_o = -V_c$, no action is needed. If the steering angle changes, continued observations will reveal the object's true location by using multi-pair matching. Special case 1430 illustrates a car 1404 and an object 1402 moving in opposite direction at constant (but different) speeds. In this regard, $-kV_o = V_c$ where k is a constant. Here, no action is needed despite object 1402 being detected as a fixed object closer than it actually is. No action is needed because a steering angle threshold of the car 1404 is not exceeded.

Figure 15A:
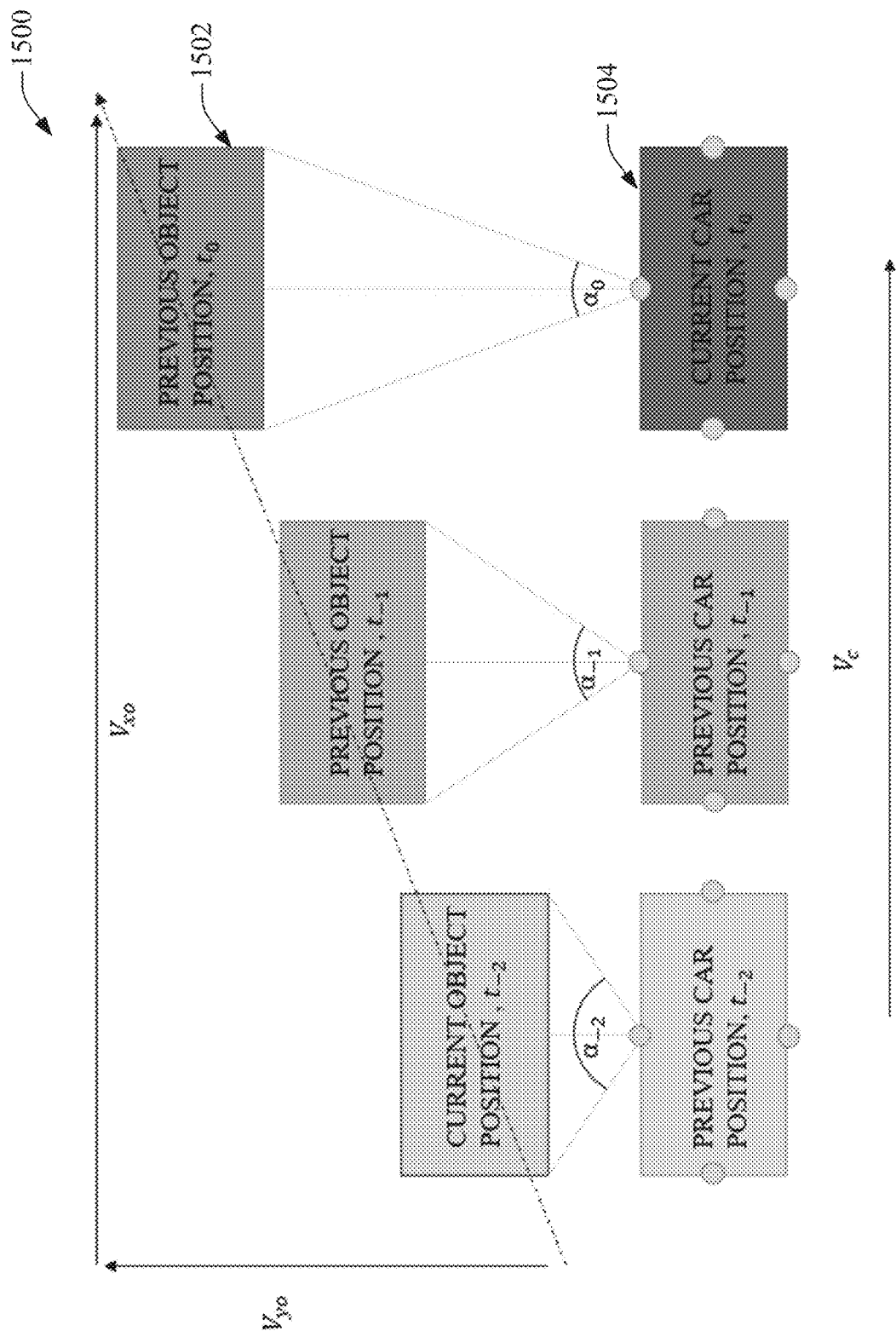
FIGS. 15A-15D illustrate diagrams of exemplary, non-limiting special cases in accordance with one or more embodiments described herein.

FIG. 15A illustrates a special case 1500 in which an object 1502 and car 1504 possess constant movement (same x direction and receding y direction). Here, $V_{xo} = V_c$. In this regard, there exists a perceived (single point) fixed location: ∞. No action (e.g., no collision avoidance) is required as multipoint detection reveals that scale (e.g., angle α) is decreasing and thus the object is receding.

Figure 15B:
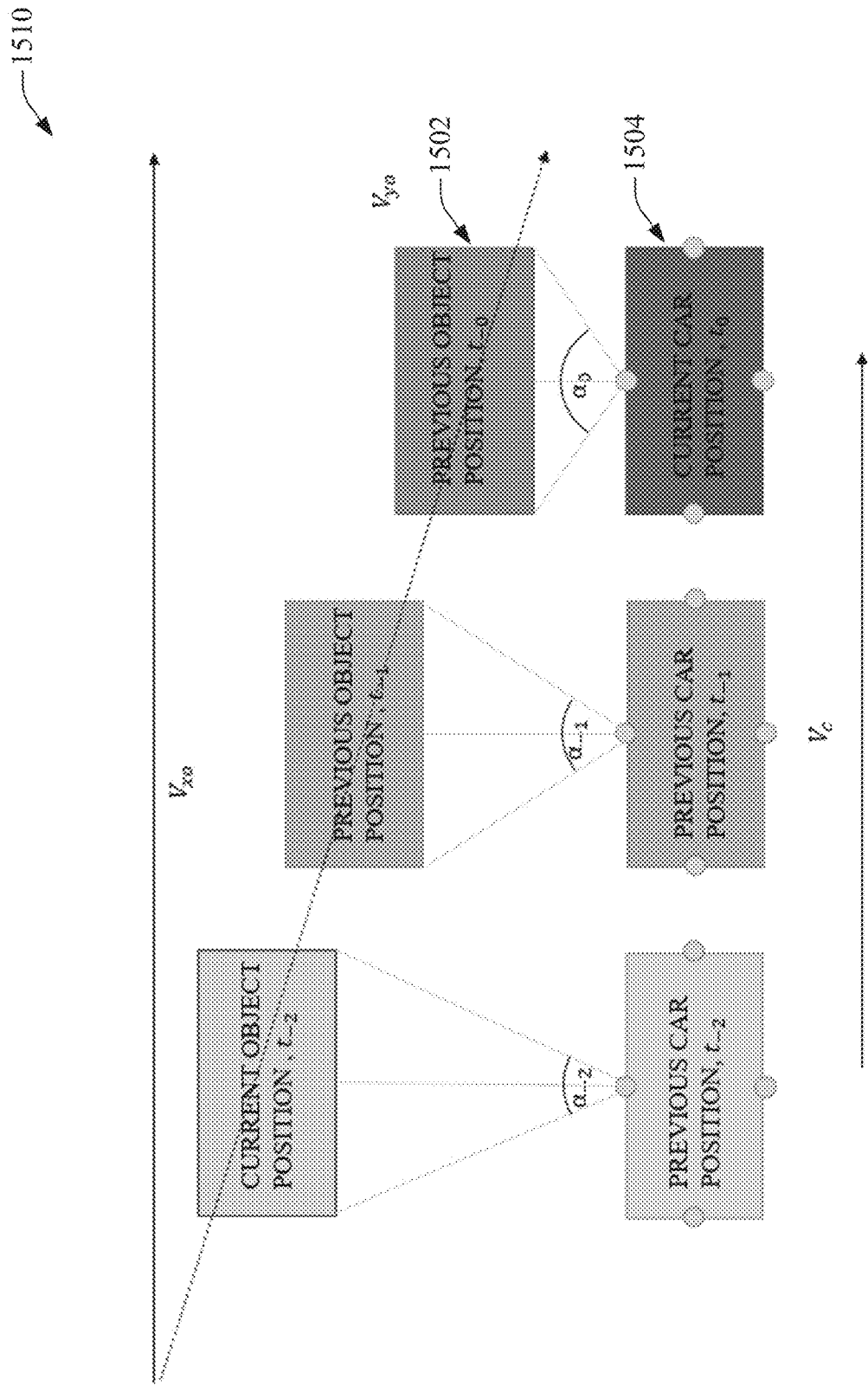

FIG. 15B illustrates a special case 1510 in which an object 1502 and car 1504 possess constant movement (same x direction and approaching y direction). Here, $V_{xo} = V_c$. In this regard, there exists a perceived (single point) fixed location: co. Multipoint detection reveals that the scale (e.g., angle α) is increasing, hence the object must be approaching. Predicted collision time occurs when α=180°. Therefore, if the predicted collision time is within a threshold value, a system (e.g., system 102, 202, or 302) can issue a warning or take a different collision mitigation action. Otherwise, such a system can continue monitoring.

Figure 15C:
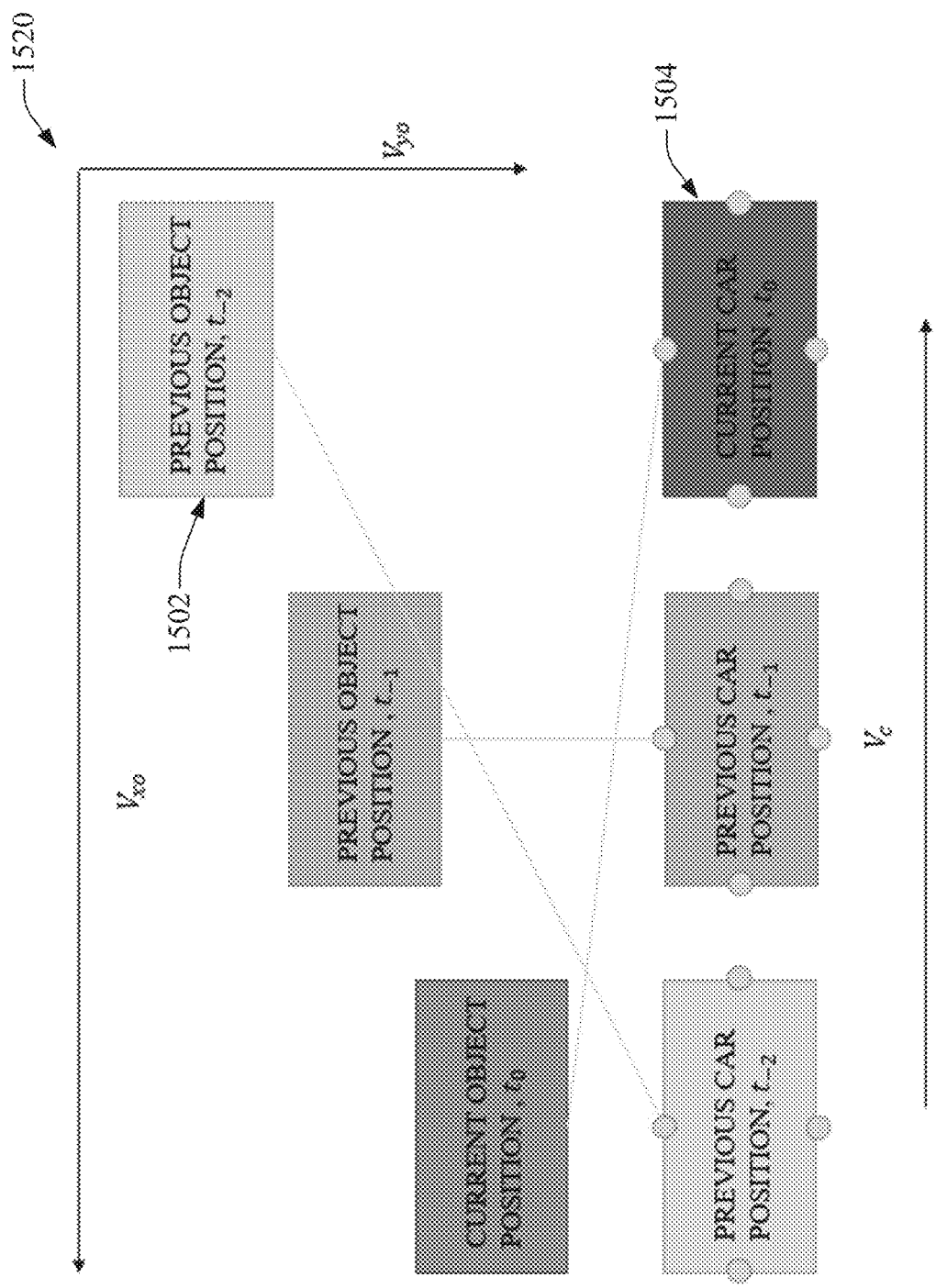

FIG. 15C illustrates a special case 1520 in which an object 1502 and car 1504 possess constant movement (opposite x direction and approaching y direction). Here, $V_o = V_c$ and thus there is not a perceived fixed location. This special case 1520 is identified as moving object (discarded before special case identification).

Figure 15D:
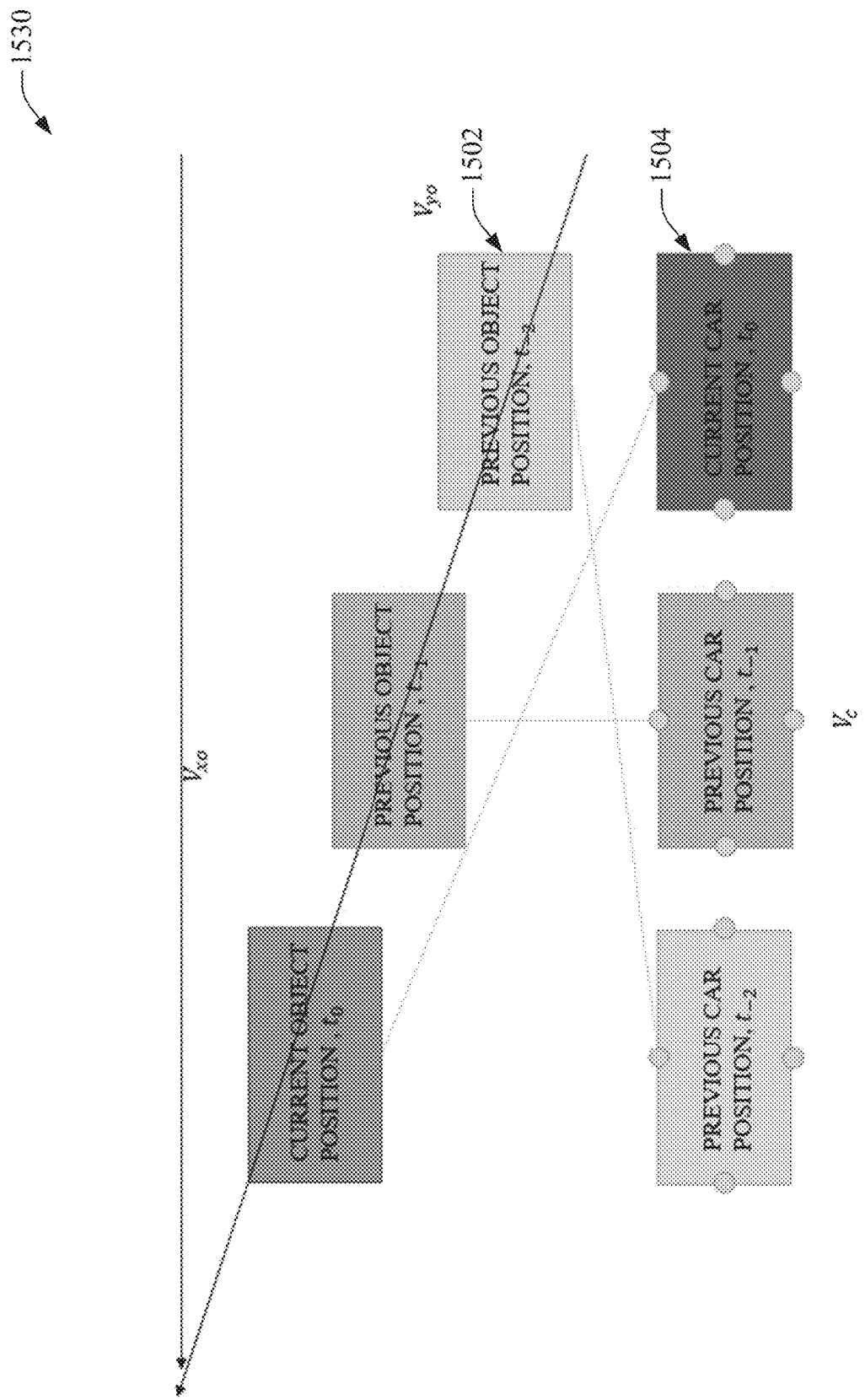

FIG. 15D illustrates a special case 1530 in which an object 1502 and car 1504 possess constant movement (opposite x direction and receding y direction). Here, $V_o = V_c$ and thus there is not a perceived fixed location. This special case 1530 is identified as moving object (discarded before special case identification).

Figure 16:
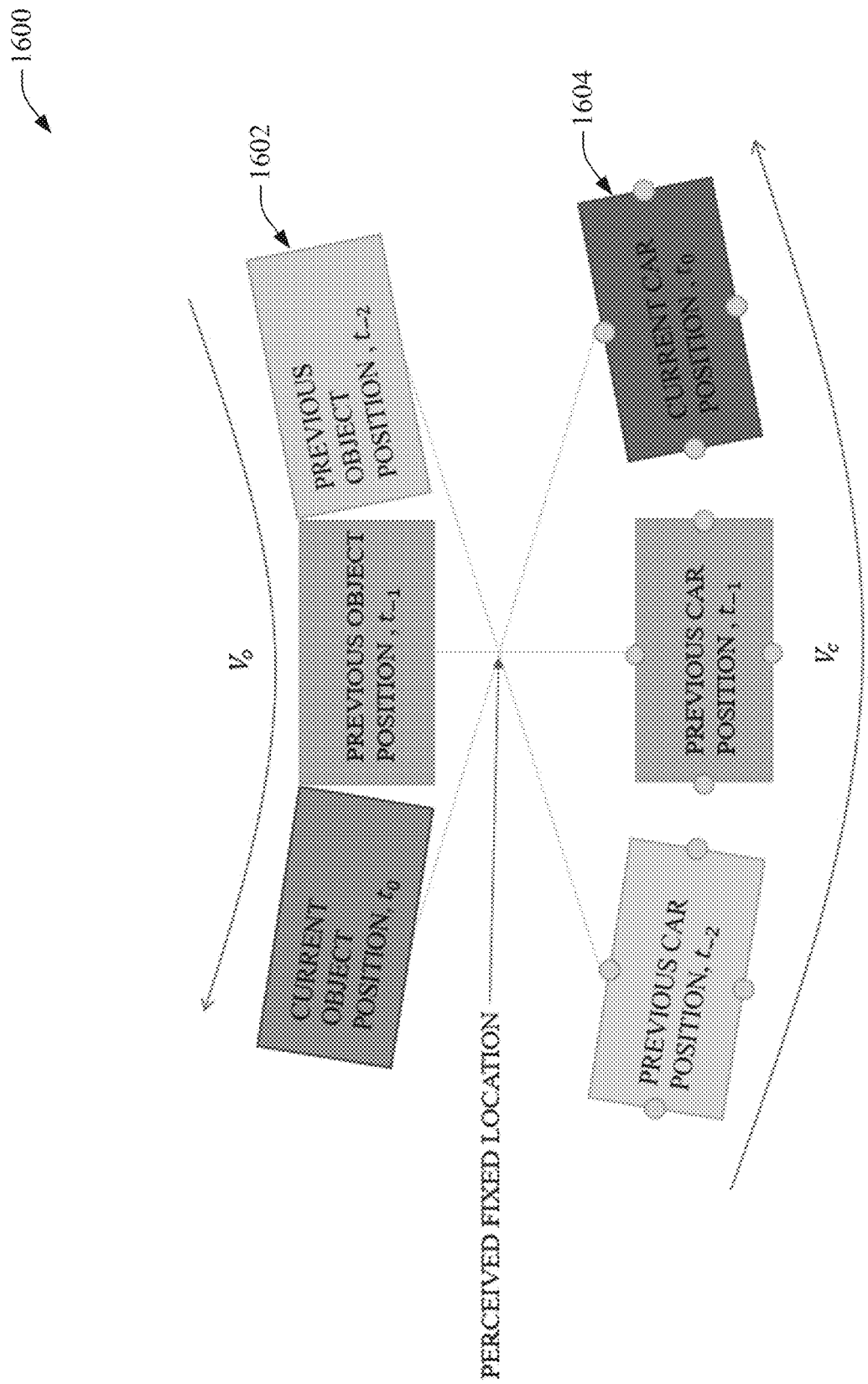
FIG. 16 illustrates a diagram of an exemplary, non-limiting special case in accordance with one or more embodiments described herein.

FIG. 16 illustrates a special case 1600 in which an object 1602 and a car 1604 are turning on trajectories of similar curves in opposite directions. Here, though object 1602 is detected as a fixed object, closer than in reality, no action is needed due to a steering angle of the car 1604 resulting in the perception of the object being fixed at a location which would not pose an impact threat to the car 1604.

Figure 17:
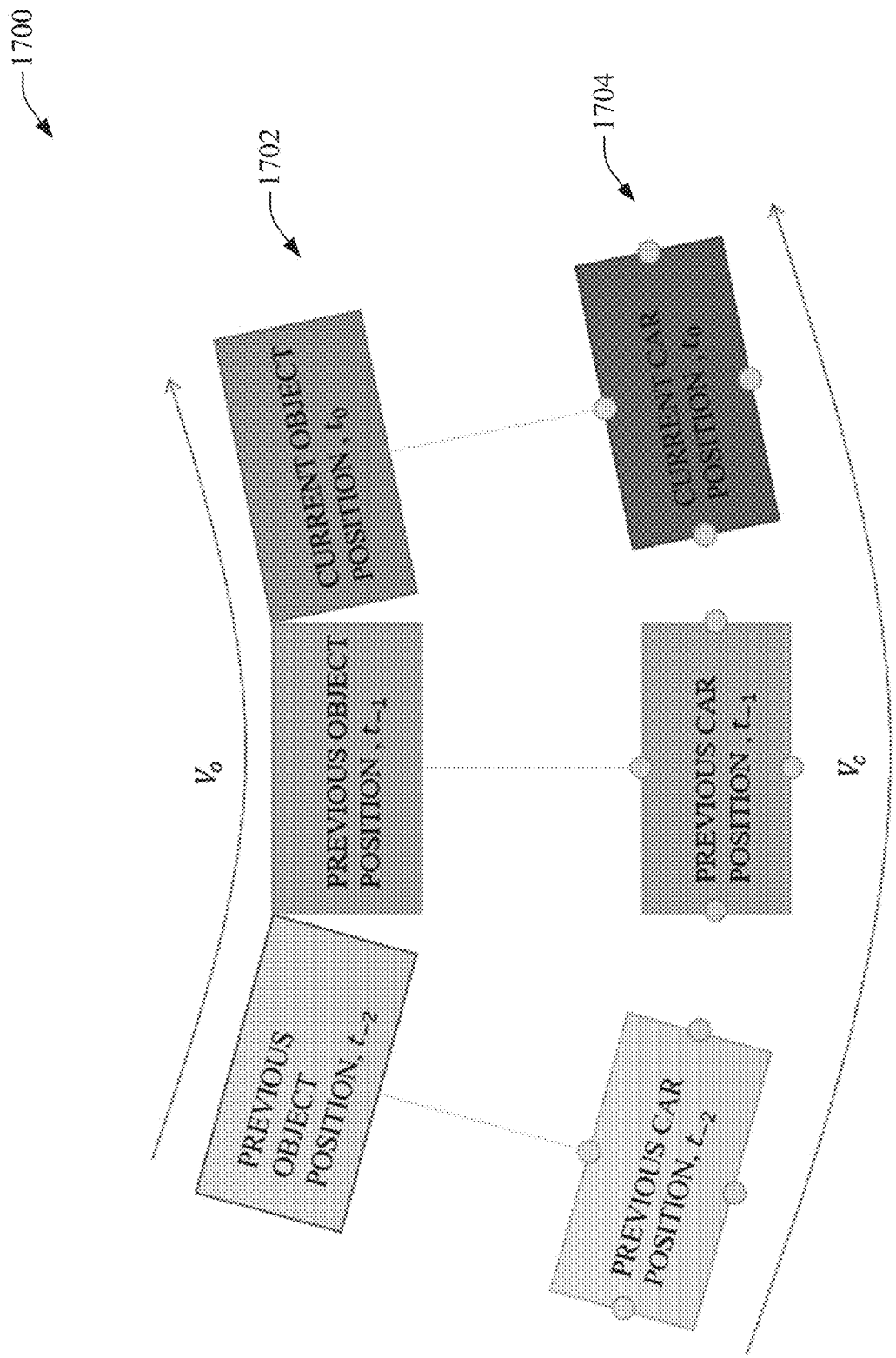
FIG. 17 illustrates a diagram of an exemplary, non-limiting special case in accordance with one or more embodiments described herein.

FIG. 17 illustrates a special case 1700 in which an object 1702 and a car 1704 are turning on trajectories of similar curves in the same direction. Here, though a perceived location is very distant no action is needed because multipoint detection reveals constant scale, (e.g., object is maintaining a constant, but unknown, distance.) For instance, a perceived location of 20 meters or greater could be treated as very distance such that no action is needed, however, other thresholds greater than or less than 20 meters can be utilized. Further, such thresholds can be modified or otherwise adaptable (e.g., according to a setting or using machine learning to determine optimal threshold distances).

Figure 18:
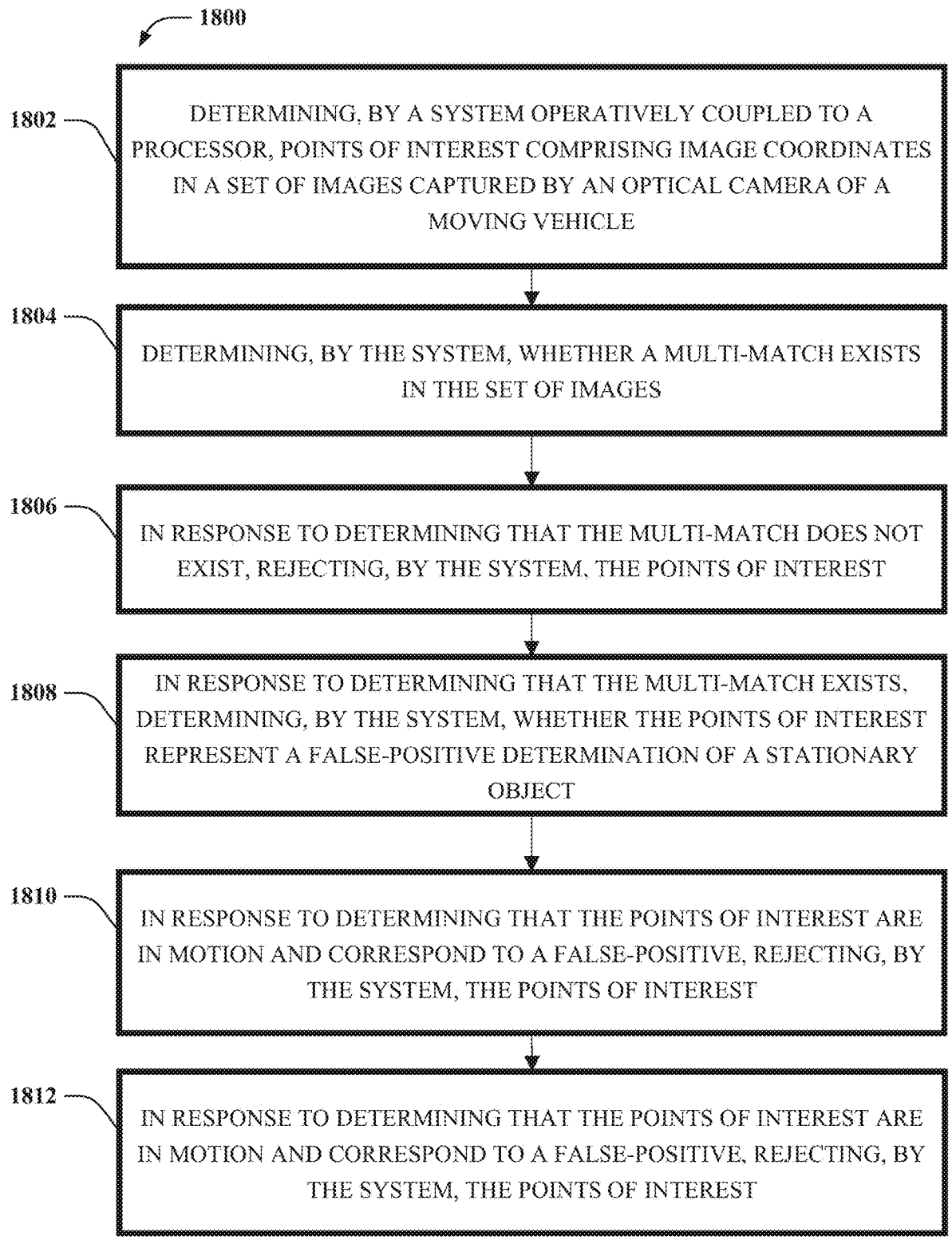
FIG. 18 illustrates a flow diagram of an example, non-limiting computer-implemented method that can mitigate a collision with a stationary object in accordance with one or more embodiments described herein.

FIG. 18 illustrates a flow diagram of an example, non-limiting computer-implemented method 1800 that can mitigate a collision with a stationary object in accordance with one or more embodiments described herein. Repetitive description of like elements and/or processes employed in respective embodiments is omitted for sake of brevity. At 1802, computer-implemented method 1800 can comprise determining, by a system operatively coupled to a processor, points of interest comprising image coordinates in a set of images captured by an optical camera of a moving vehicle. At 1804, the computer-implemented method 1800 can comprise determining, by the system, whether a multi-match exists in the set of images. At 1806, the computer-implemented method 1800 can comprise in response to determining that the multi-match does not exist, rejecting, by the system, the points of interest. At 1808, the computer-implemented method 1800 can comprise in response to determining that the multi-match exists, determining, by the system, whether the points of interest represent a false-positive determination of a stationary object. At 1810, the computer-implemented method 1800 can comprise in response to determining that the points of interest are in motion and correspond to a false-positive, rejecting, by the system, the points of interest. At 1812, the computer-implemented method 1800 can comprise in response to determining that the points of interest are in motion and correspond to a false-positive, rejecting, by the system, the points of interest.

Figure 19:
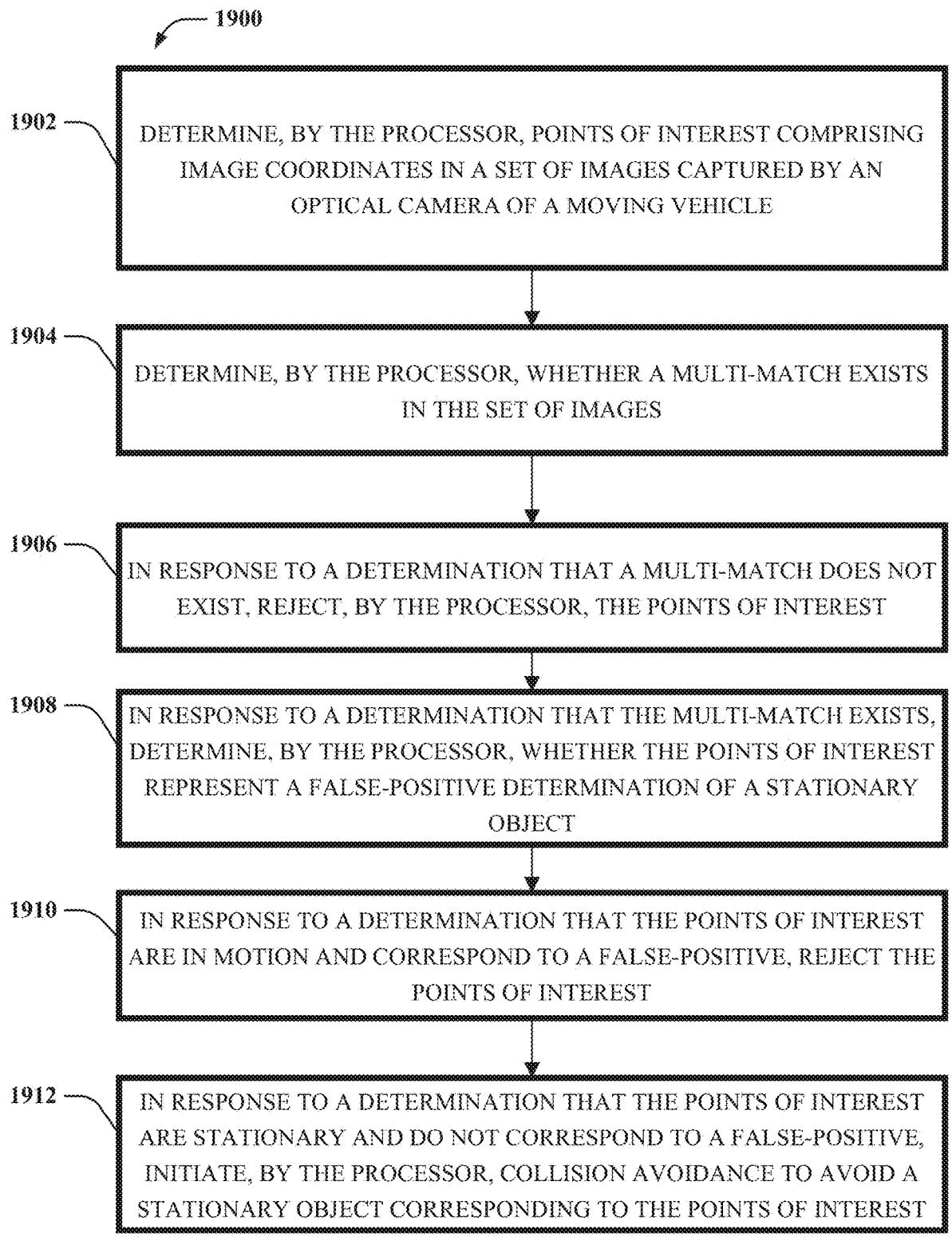
FIG. 19 illustrates a flow diagram of an example, computer program product that can mitigate a collision with a stationary object in accordance with one or more embodiments described herein.

FIG. 19 illustrates a flow diagram of example, non-limiting program instructions 1900 that can mitigate a collision with a stationary object in accordance with one or more embodiments described herein. Repetitive description of like elements and/or processes employed in respective embodiments is omitted for sake of brevity. At 1902, points of interest comprising image coordinates in a set of images captured by an optical camera of a moving vehicle are determined. At 1904, whether a multi-match exists in the set of images is determined. At 1906, the points of interest are rejected in response to a determination that a multi-match does not exist. At 1908, whether the points of interest represent a false-positive determination of a stationary object is determined in response to a determination that the multi-match exists. At 1910, the points of interest are rejected in response to a determination that the points of interest are in motion and correspond to a false-positive. At 1912, collision avoidance to avoid a stationary object corresponding to the points of interest is initiated in response to a determination that the points of interest are stationary and do not correspond to a false-positive.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, system 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, system herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 102 can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processor 106 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, point of interest (POI) identification (ID) component 108, matching component 110, motion determination component 112, bus 114, camera 116, collision avoidance component 204, and/or artificial intelligence component 304 and/or any other components associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments, system herein and/or any components associated therewith as disclosed herein, can employ a processor (e.g., processor 106) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 302 or any other system or controller described herein) can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 20:
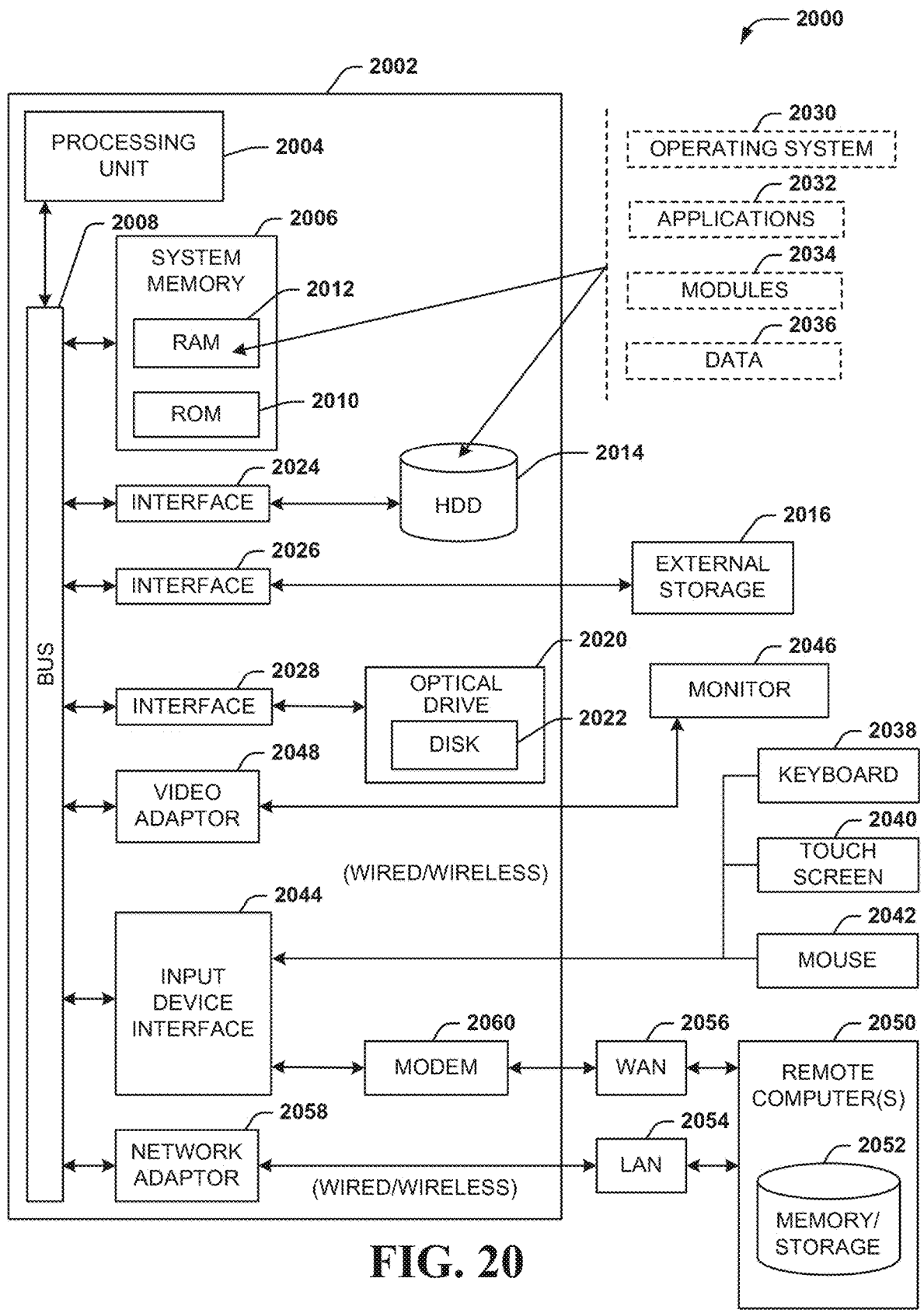
FIG. 20 is an example, non-limiting computing environment in which one or more embodiments described herein can be implemented.

In order to provide additional context for various embodiments described herein, FIG. 20 and the following discussion are intended to provide a brief, general description of a suitable computing environment 2000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid-state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1794 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for applications 2032. Runtime environments are consistent execution environments that allow applications 2032 to run on any operating system that includes the runtime environment. Similarly, operating system 2030 can support containers, and applications 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance, with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2046 or other type of display device can be also connected to the system bus 2008 via an interface, such as a video adapter 2048. In addition to the monitor 2046, a computer typically includes other peripheral output devices (not shown), such as speakers, printers, etc.

The computer 2002 can operate in a networked environment using logical connections via wired and/or wireless communications to one or more remote computers, such as a remote computer(s) 2050. The remote computer(s) 2050 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2052 is illustrated. The logical connections depicted include wired/wireless connectivity to a local area network (LAN) 2054 and/or larger networks, e.g., a wide area network (WAN) 2056. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2054 through a wired and/or wireless communication network interface or adapter 2058. The adapter 2058 can facilitate wired or wireless communication to the LAN 2054, which can also include a wireless access point (AP) disposed thereon for communicating with the adapter 2058 in a wireless mode.

When used in a WAN networking environment, the computer 2002 can include a modem 2060 or can be connected to a communications server on the WAN 2056 via other means for establishing communications over the WAN 2056, such as by way of the Internet. The modem 2060, which can be internal or external and a wired or wireless device, can be connected to the system bus 2008 via the input device interface 2044. In a networked environment, program modules depicted relative to the computer 2002 or portions thereof, can be stored in the remote memory/storage device 2052. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2054 or WAN 2056 e.g., by the adapter 2058 or modem 2060, respectively. Upon connecting the computer 2002 to an associated cloud storage system, the external storage interface 2026 can, with the aid of the adapter 2058 and/or modem 2060, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 21:
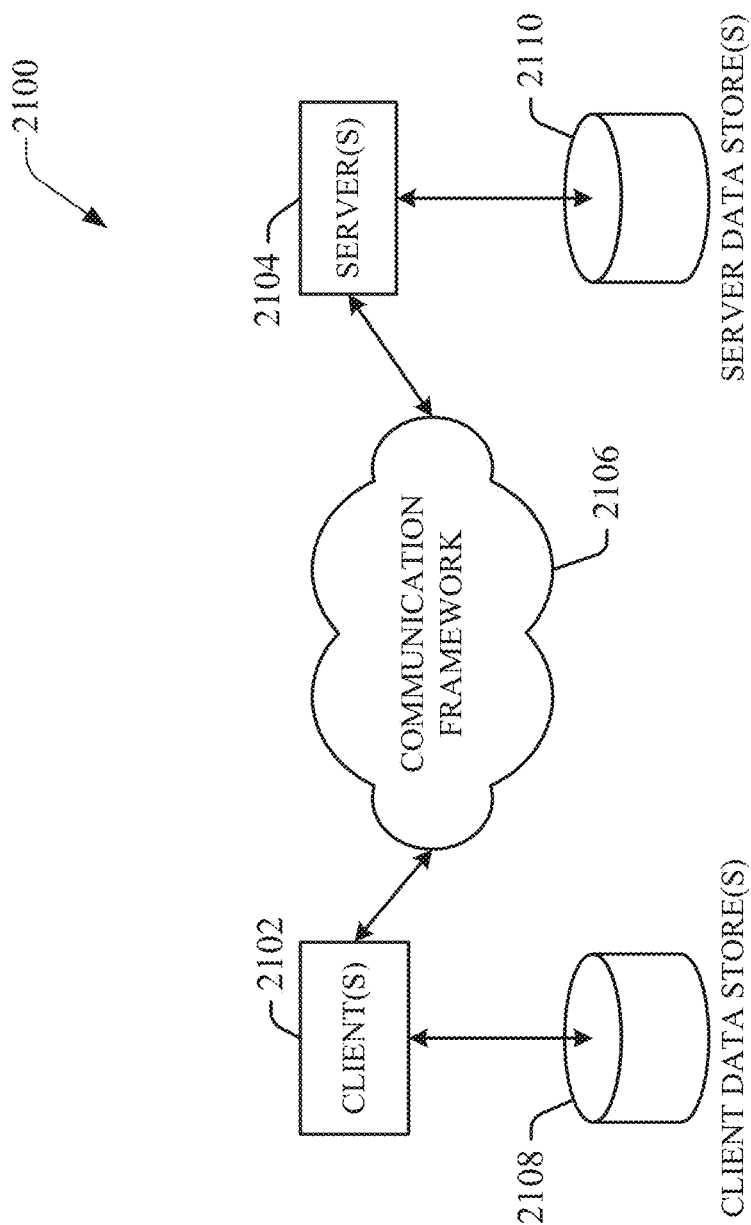
FIG. 21 is an example, non-limiting networking environment in which one or more embodiments described herein can be implemented.

Referring now to FIG. 21, there is illustrated a schematic block diagram of a computing environment 2100 in accordance with this specification. The system 2100 includes one or more client(s) 2102, (e.g., computers, smart phones, tablets, cameras, PDA's). The client(s) 2102 can be hardware and/or software (e.g., threads, processes, computing devices). The client(s) 2102 can house cookie(s) and/or associated contextual information by employing the specification, for example.

The system 2100 also includes one or more server(s) 2104. The server(s) 2104 can also be hardware or hardware in combination with software (e.g., threads, processes, computing devices). The servers 2104 can house threads to perform transformations of media items by employing aspects of this disclosure, for example. One possible communication between a client 2102 and a server 2104 can be in the form of a data packet adapted to be transmitted between two or more computer processes wherein data packets can include coded analyzed headspaces and/or input. The data packet can include a cookie and/or associated contextual information, for example. The system 2100 includes a communication framework 2106 (e.g., a global communication network such as the Internet) that can be employed to facilitate communications between the client(s) 2102 and the server(s) 2104.

Communications can be facilitated via a wired (including optical fiber) and/or wireless technology. The client(s) 2102 are operatively connected to one or more client data store(s) 2108 that can be employed to store information local to the client(s) 2102 (e.g., cookie(s) and/or associated contextual information). Similarly, the server(s) 2104 are operatively connected to one or more server data store(s) 2110 that can be employed to store information local to the servers 2104.

In one exemplary implementation, a client 2102 can transfer an encoded file, (e.g., encoded media item), to server 2104. Server 2104 can store the file, decode the file, or transmit the file to another client 2102. It is to be appreciated, that a client 2102 can also transfer uncompressed file to a server 2104 and server 2104 can compress the file and/or transform the file in accordance with this disclosure. Likewise, server 2104 can encode information and transmit the information via communication framework 2106 to one or more clients 2102.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A computer-implemented method, comprising: determining, by a system operatively coupled to a processor, points of interest comprising image coordinates in a set of images captured by an optical camera of a moving vehicle, determining, by the system, whether a multi-match exists in the set of images, in response to determining that the multi-match does not exist, rejecting, by the system, the points of interest, in response to determining that the multi-match exists, determining, by the system, whether the points of interest represent a false-positive determination of a stationary object, in response to determining that the points of interest are in motion and correspond to a false-positive, rejecting, by the system, the points of interest, and in response to determining that the points of interest are stationary and do not correspond to a false-positive, initiating, by the system, collision avoidance to avoid a stationary object corresponding to the points of interest.

2. The computer-implemented method of any preceding clause, wherein determining whether the multi-match exists comprises: determining, by the system, whether a first point of interest in a first image of the set of images corresponds to a second point of interest in a second image of the set of images, determining, by the system, whether the first point of interest in the first image corresponds to a third point of interest in a third image of the set of images, and determining, by the system, whether the second point of interest in the second image corresponds to the third point of interest in the third image.

3. The computer-implemented method of any preceding clause, wherein false-positive comprises a moving object that comprises a trajectory parallel to a trajectory of the moving vehicle.

4. The computer-implemented method of any preceding clause, wherein the collision avoidance comprises initiating automated braking of the moving vehicle.

5. The computer-implemented method of any preceding clause, wherein the collision avoidance comprises displaying a message on a display in the moving vehicle.

6. The computer-implemented method of any preceding clause, wherein the collision avoidance comprises generating haptic feedback in a steering wheel or in a seat of the moving vehicle.

7. The computer-implemented method of clause 1 above with any set of combinations of the computer-implemented methods 2-6 above.

8. A system, comprising: a memory that stores computer executable components, and a processor that executes the computer executable components stored in the memory, wherein the computer executable components comprise: a point of interest identification component that determines points of interest comprising image coordinates in a set of images captured by an optical camera of a moving vehicle, a matching component that determines whether a multi-match exists in the set of images, a motion determination component that determines whether the points of interest are stationary or in motion in response to determination by the matching component that the multi-match exists, and rejects the points of interest in response to a determination that the points of interest are in motion, wherein points of interest in motion correspond to a false-positive, and a collision avoidance component that initiates collision avoidance to avoid a stationary object corresponding to the points of interest in response to a determination by the motion determination component that the points of interest are stationary.

9. The system of any preceding clause, wherein the matching component: determines whether a first point of interest in a first image of the set of images corresponds to a second point of interest in a second image of the set of images, determines whether the first point of interest in the first image corresponds to a third point of interest in a third image of the set of images, and determines whether the second point of interest in the second image corresponds to the third point of interest in the third image, rejects the points of interest in response to a determination that a multi-match does not exist.

10. The system of any preceding clause, wherein the collision avoidance comprises determining a trajectory of the vehicle based on a steering angle of the vehicle and a velocity of the vehicle and determining a collision risk with the stationary object.

11. The system of any preceding clause, wherein the determination by the motion determination component of whether the points of interest are stationary or in motion comprises a determination of whether a false-positive determination of the stationary object occurred and rejecting the false-positive.

12. The system of any preceding clause, wherein the false-positive comprises parallel trajectories, the parallel trajectories comprising a moving object that comprises a trajectory parallel to a trajectory of the moving vehicle, and wherein the parallel trajectories comprise parallel curved paths.

13. The system of any preceding clause, wherein the false-positive comprises parallel trajectories, the parallel trajectories comprising a moving object that comprises a trajectory parallel to a trajectory of the moving vehicle, and wherein the parallel trajectories comprise straight paths.

14. The system of any preceding clause, wherein the computer executable components further comprise: an artificial intelligence component that learns to perform at least one of: determining whether a multi-match exists in the set of images, or determining whether the points of interest are stationary or in motion.

15. The system of clause 8 above with any set of combinations of the systems 9-14 above.

16. A computer program product comprising a computer readable storage medium having program instructions embodied therewith, the program instructions executable by a processor to cause the processor to: determine, by the processor, points of interest comprising image coordinates in a set of images captured by an optical camera of a moving vehicle, determine, by the processor, whether a multi-match exists in the set of images, in response to a determination that a multi-match does not exist, reject, by the processor, the points of interest, in response to a determination that the multi-match exists, determine, by the processor, whether the points of interest represent a false-positive determination of a stationary object, in response to a determination that the points of interest are in motion and correspond to a false-positive, reject the points of interest, and in response to a determination that the points of interest are stationary and do not correspond to a false-positive, initiate, by the processor, collision avoidance to avoid a stationary object corresponding to the points of interest.

17. The computer program product of any preceding clause, wherein the set of images are captured by the same optical camera at different positions, each position of the different positions occurring at different points in time.

18. The computer program product of any preceding clause, wherein the determination of whether the points of interest are stationary or in motion comprises determining whether the points of interest correspond to one or more of a group of defined special false-positive cases, and wherein defined special false-positive cases are rejected as being in motion.

19. The computer program product of any preceding clause, wherein a special false-positive case of the defined special false-positive cases comprises parallel movement between a moving object and the vehicle.

20. The computer program product of any preceding clause, wherein a special false-positive case of the defined special false-positive cases comprises straight movement in opposite directions at constant speeds between a moving object and the vehicle.

21. The computer program product of any preceding clause, wherein a special false-positive case of the defined special false-positive cases comprises straight movement in opposite directions at different speeds between a moving object and the vehicle.

22. The computer program product of any preceding clause, wherein the optical camera is located on a side of the vehicle or a sideview mirror of the vehicle comprises the optical camera.

23. The computer program product of clause 16 above with any set of combinations of the computer program products of clauses 17-22 above.

What is claimed is:

1. A computer-implemented method, comprising:
   determining, by a system operatively coupled to a processor, points of interest comprising image coordinates in a set of images captured by an optical camera of a moving vehicle;
   determining, by the system, whether a multi-match exists in the set of images;
   in response to determining that the multi-match does not exist, rejecting, by the system, the points of interest;
   in response to determining that the multi-match exists, determining, by the system, whether the points of interest represent a false-positive determination of a stationary object;
   in response to determining that the points of interest are in motion and correspond to the false-positive determination, rejecting, by the system, the points of interest; and
   in response to determining that the points of interest are stationary and do not correspond to the false-positive determination, initiating, by the system, collision avoidance to avoid the stationary object corresponding to the points of interest.

2. The computer-implemented method of claim 1, wherein determining whether the multi-match exists comprises:
   determining, by the system, whether a first point of interest in a first image of the set of images corresponds to a second point of interest in a second image of the set of images,
   determining, by the system, whether the first point of interest in the first image corresponds to a third point of interest in a third image of the set of images, and
   determining, by the system, whether the second point of interest in the second image corresponds to the third point of interest in the third image.

3. The computer-implemented method of claim 1, wherein false-positive comprises a moving object that comprises a first trajectory that is parallel to a second trajectory of the moving vehicle.

4. The computer-implemented method of claim 1, wherein the collision avoidance comprises initiating automated braking of the moving vehicle.

5. The computer-implemented method of claim 1, wherein the collision avoidance comprises displaying a message on a display in the moving vehicle.

6. The computer-implemented method of claim 1, wherein the collision avoidance comprises generating haptic feedback in a steering wheel or in a seat of the moving vehicle.

7. A system, comprising:
   a memory that stores computer executable components; and
   a processor that executes the computer executable components stored in the memory, wherein the computer executable components comprise:
   a point of interest identification component that determines points of interest comprising image coordinates in a set of images captured by an optical camera of a moving vehicle;
   a matching component that determines whether a multi-match exists in the set of images;
   a motion determination component that determines whether the points of interest are stationary or in motion in response to the matching component determining that the multi-match exists, and rejects the points of interest in response to determining that the points of interest are in motion, wherein the points of interest in motion correspond to a false-positive; and
   a collision avoidance component that initiates collision avoidance to avoid a stationary object corresponding to the points of interest in response to the motion determination component determining that the points of interest are stationary.

8. The system of claim 7, wherein the matching component:
   determines whether a first point of interest in a first image of the set of images corresponds to a second point of interest in a second image of the set of images,
   determines whether the first point of interest in the first image corresponds to a third point of interest in a third image of the set of images, and
   determines whether the second point of interest in the second image corresponds to the third point of interest in the third image;
   rejects the points of interest in response to determining that the multi-match does not exist.

9. The system of claim 7, wherein the collision avoidance comprises determining a trajectory of the moving vehicle based on a steering angle of the moving vehicle and a velocity of the moving vehicle and determining a collision risk with the stationary object.

10. The system of claim 7, wherein the determination by the motion determination component of whether the points of interest are stationary or in motion comprises determining whether the false-positive occurred and rejecting the false-positive.

11. The system of claim 10, wherein the false-positive comprises parallel trajectories, the parallel trajectories comprising a moving object that comprises a first trajectory that is parallel to a second trajectory of the moving vehicle, and wherein the parallel trajectories comprise parallel curved paths.

12. The system of claim 10, wherein the false-positive comprises parallel trajectories, the parallel trajectories comprising a moving object that comprises a first trajectory that is parallel to a second trajectory of the moving vehicle, and wherein the parallel trajectories comprise straight paths.

13. The system of claim 7, wherein the computer executable components further comprise:
   an artificial intelligence component that learns to perform at least one of:
   determining whether the multi-match exists in the set of images; or
   determining whether the points of interest are stationary or in motion.

14. A computer program product comprising a non-transitory computer readable medium having program instructions embodied therewith, the program instructions executable by a processor to cause the processor to:
   determine, by the processor, points of interest comprising image coordinates in a set of images captured by an optical camera of a moving vehicle;

determine, by the processor, whether a multi-match exists in the set of images;

in response to determining that the multi-match does not exist, reject, by the processor, the points of interest;

in response to determining that the multi-match exists, determine, by the processor, whether the points of interest represent a false-positive determination of a stationary object;

in response to determining that the points of interest are in motion and correspond to the false-positive determination, reject the points of interest; and in response to determining that the points of interest are stationary and do not correspond to the false-positive determination, initiate, by the processor, collision avoidance to avoid the stationary object corresponding to the points of interest.

15. The computer program product of claim 14, wherein the set of images are captured by the optical camera at different positions, each position of the different positions occurring at different points in time.

16. The computer program product of claim 14, wherein the determination of whether the points of interest are stationary or in motion comprises determining whether the points of interest correspond to one or more of a group of defined special false-positive cases, and wherein defined special false-positive cases are rejected as being in motion.

17. The computer program product of claim 16, wherein a special false-positive case of the defined special false-positive cases comprises parallel movement between a moving object and the moving vehicle.

18. The computer program product of claim 16, wherein a special false-positive case of the defined special false-positive cases comprises straight movement in opposite directions at constant speeds between a moving object and the moving vehicle.

19. The computer program product of claim 16, wherein a special false-positive case of the defined special false-positive cases comprises straight movement in opposite directions at different speeds between a moving object and the moving vehicle.

20. The computer program product of claim 14, wherein the optical camera is located on a side of the moving vehicle or a sideview mirror of the moving vehicle comprises the optical camera.

* * * * *